US011200288B1

(12) United States Patent
Baker et al.

(10) Patent No.: US 11,200,288 B1
(45) Date of Patent: Dec. 14, 2021

(54) VALIDATING INTERESTS FOR A SEARCH AND FEED SERVICE

(71) Applicant: Laserlike, Inc., Mountain View, CA (US)

(72) Inventors: Steven Baker, Palo Alto, CA (US); Hang Zhao, Mountain View, CA (US); Kushal Tayal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 596 days.

(21) Appl. No.: 15/664,766

(22) Filed: Jul. 31, 2017

(51) Int. Cl.
*G06F 16/00* (2019.01)
*G06F 16/9535* (2019.01)
*G06F 16/93* (2019.01)
*G06F 16/2457* (2019.01)

(52) U.S. Cl.
CPC .... *G06F 16/9535* (2019.01); *G06F 16/24578* (2019.01); *G06F 16/93* (2019.01)

(58) Field of Classification Search
CPC ........... G06F 16/9535; G06F 16/24578; G06F 3/04847; G06F 16/435; G06F 40/30; G06F 16/437; G06F 16/901; G06F 16/951; G06F 17/18; G06F 16/9566; G06F 16/972
See application file for complete search history.

(56) References Cited

U.S. PATENT DOCUMENTS

| | | | |
|---|---|---|---|
| 2011/0161260 A1* | 6/2011 | Burges | G06F 16/9566 706/12 |
| 2015/0066917 A1* | 3/2015 | Wang | G06F 16/9535 707/723 |
| 2015/0199438 A1* | 7/2015 | Talyansky | G06F 16/2468 707/730 |
| 2016/0247078 A1* | 8/2016 | Gaw | G06N 5/048 |
| 2017/0060872 A1* | 3/2017 | Sacheti | G06F 16/24578 |
| 2017/0083015 A1* | 3/2017 | Erickson | G05B 23/0272 |
| 2017/0109515 A1* | 4/2017 | Aharoni | G06F 21/31 |

* cited by examiner

*Primary Examiner* — Dinku W Gebresenbet
(74) *Attorney, Agent, or Firm* — Morgan, Lewis & Bockius LLP

(57) ABSTRACT

A curation score associated with an entity is determined. A good interest probability value associated with the entity is determined. A content feed for a user that includes one or more web documents is generated based in part on the curation score and the good interest probability value.

20 Claims, 20 Drawing Sheets

VALIDATING INTERESTS FOR A SEARCH AND FEED SERVICE

BACKGROUND OF THE INVENTION

Web services can be used to provide communications between electronic/computing devices over a network, such as the Internet. A website is an example of a type of web service. A website is typically a set of related web pages that can be served from a web domain. A website can be hosted on a web server or appliance. A publicly accessible website can generally be accessed via the Internet. The publicly accessible collection of websites is generally referred to as the World Wide Web (WWW).

Internet-based web services can be delivered through websites on the World Wide Web. Web pages are often formatted using HyperText Markup Language (HTML), eXtensible HTML (XHTML), or using another language that can be processed by client software, such as a web browser that is typically executed on a user's client device, such as a computer, tablet, phablet, smart phone, smart watch, smart television, or other (client) device. A website can be hosted on a web server (e.g., a web server or appliance) that is typically accessible via a network, such as the Internet, through a web address, which is generally known as a Uniform Resource Indicator (URI) or a Uniform Resource Locator (URL).

Search engines can be used for searching for content on the World Wide Web, such as to identify relevant websites for particular online content and/or services on the World Wide Web. Search engines (e.g., web-based search engines provided by various vendors, including, for example, Google®, Microsoft Bing®, and Yahoo®) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). Search engines generally index website content, such as web pages of crawled websites, and then identify relevant content (e.g., URLs for matching web pages) based on matches to keywords received in a user query that includes one or more terms or keywords. For example, a search engine can perform a search based on the user query and output results that are typically presented in a ranked list, often referred to as search results or hits (e.g., links or URIs/URLs for one or more web pages and/or websites). The search results can include web pages, images, audio, video, database results, directory results, information, and other types of data.

Search engines typically provide paid search results (e.g., the first set of results in the main listing and/or results often presented in a separate listing on, for example, the right side of the output screen). For example, advertisers may pay for placement in such paid search results based on keywords (e.g., keywords in search queries). Search engines also typically provide organic search results, also referred to as natural search results. Organic search results are generally based on various search algorithms employed by different search engines that attempt to provide relevant search results based on a received user query that includes one or more terms or keywords.

BRIEF DESCRIPTION OF THE DRAWINGS

Various embodiments of the invention are disclosed in the following detailed description and the accompanying drawings.

DETAILED DESCRIPTION

Figure 1:
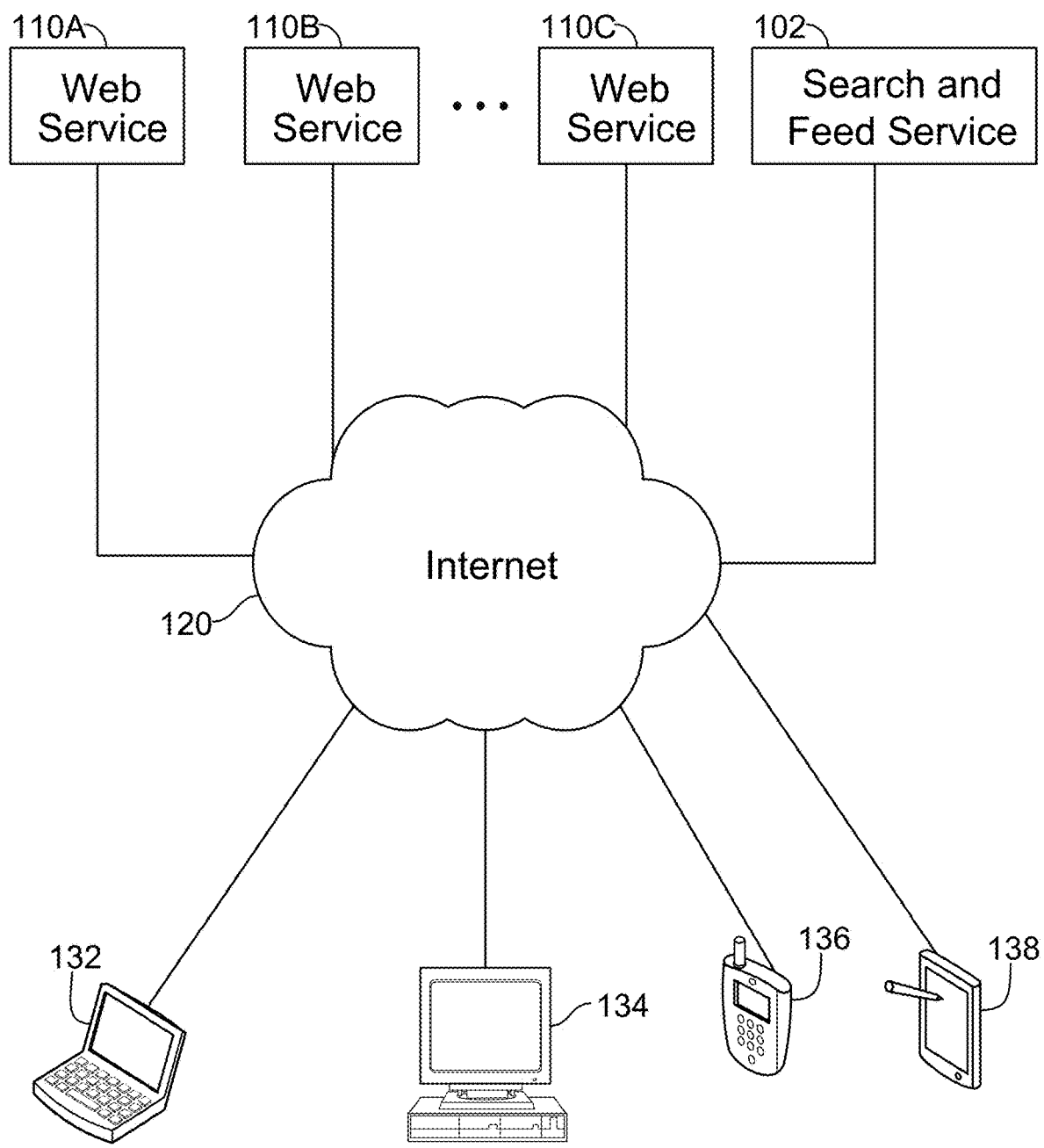
FIG. 1 is a block diagram illustrating an overview of an architecture of a system for providing a search and feed service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for providing an enhanced search to generate a feed based on a user's interests are disclosed. In some embodiments, a system/process/computer program product for providing an enhanced search to generate a feed based on a user's interests includes receiving a plurality of interests associated with a user, searching online content including one or more websites (e.g., websites, social networking sites, and/or other online content) based on the plurality of interests associated with the user, receiving a plurality of web documents (e.g., links to websites, social networking sites, and other online content) based on the search for online content, ranking the plurality of web documents based on a document score and a user signal, and generating a content feed that includes at least a subset of the plurality of web documents based on the ranking.

In an example implementation, the disclosed techniques are implemented as a web service for a search and feed service that performs a search (e.g., also referred to herein as a not now search) and generates a content feed based on a user's interests. The web service can determine a user's set of interests using various techniques described below and then perform a not now search to generate a content feed based on the user's interests (e.g., the search and feed service can determine a user's set of interests by determining online content associated with a user account associated with the user; analyzing the online content to determine a plurality of interests associated with the user account; assigning an endorsement score to each of the plurality of interests; and ranking the plurality of interests based on a confidence score that is based on the endorsement score associated with each of the plurality of interests, such as further described below). For example, the content feed can be delivered as a user content feed provided via an interface of an application (e.g., app) executed on the user's client device (e.g., a laptop, tablet, mobile phone, watch, or other computing device).

People previously used traditional sources of media to find content that was interesting to them. People could read topic specific magazines (e.g., Car & Driver®) or watch a television show on an interest-based channel (e.g., ESPN®, HGTV®, etc.). Today, many people use online sources, such as Twitter® and Flipboard®, to find content that is interesting to them. However, such sources usually require a person to specify interests before content is provided. Given the plethora of online content, there may be online content that is interesting to a person to which the person is unaware. Because online sources usually require a person to specify interests, it is unlikely that the person will become aware of such content. It would be useful to facilitate an automated search that can provide the person with content to which he or she is unaware.

Content may be associated with one or more entities. For example, an article about the 2017 NFL Super Bowl may be associated with entities such as "football," "Atlanta," "Atlanta Falcons," "New England," "New England Patriots," "NFL," "National Football League," "Tom Brady," "Lady Gaga," "Houston," "Texas," "comeback," etc. An entity may correspond to a potential interest for at least one user. In other cases, an entity may not correspond to a potential interest for any user. For example, entities may be malformed (e.g., "rocket"), too vague (e.g., "wood"), and/or of such nature that no user could possibly be interested (e.g., "2017"). Accordingly, techniques for determining whether an entity is a possible interest for any user are disclosed. In some embodiments, a set of curators tag an entity with a label indicating that the entity is a good interest, a label indicating that the entity is a bad interest, or no label at all. An interest score can be computed in the event the set of curators disagree regarding whether an entity is a good interest or a bad interest.

In some embodiments, a set of feature data can be computed for an entity. For example, an inverse document frequency (IDF) may be computed for an entity. An IDF may be computed for a plurality of entities that resolve to a single entity (e.g., "Steven Wozniak" may resolve to "Steve Wozniak."). A link probability may be computed for an entity. The link probability indicates for an entity in an information website (e.g., Wikipedia), the percentage that a string of the entity points to the entity's page of the information website. For example, the string "water" may be used throughout the information website, but only a couple of instances of the string "water" includes a link to the "water" page of the information website. A views over inlinks value may be computed for an entity. For example, an information website (e.g., Wikipedia) may determine statistics about an entity page (e.g., # of views per hour, # views per day, % increase/decrease of views day-to-day, % increase/decrease of views week-to-week, etc.). A ratio of the number of inlinks of the entity's page of the information website to the number of outlinks of the entity's page of the information website may be computed. An inlink is an embedded link within a different web document that references the web document. An outlink is an embedded link within the web document that references a different web document. A frequency at which the first letter of the entity is in lowercase across the corpus of documents may be computed. The log of the number of subscribers for a page associated with the entity may be computed. For example, a subreddit page associated with the entity may exist. The log of the number of users subscribed to the subreddit page may be computed. The set of feature data may be combined into a single value that indicates whether entity is a good interest or a bad interest.

Accordingly, techniques for providing a user interest model are disclosed. The user interest model estimates the likelihood that an interest is relevant to a user. In some embodiments, a user's interests can be determined based on online content associated with a user account associated with a user (i.e., web documents associated with a user). A user can have one or more social media accounts. For example, a user may have a Twitter® account, Facebook® account, Instagram® account, Reddit® account, Yelp® account, etc. These accounts have a "bio" or "profile" section that includes text-based information about the user. Such text-based information can be analyzed to determine a plurality of interests associated with the user account.

A user account can also be associated with one or more social media accounts of one or more other users. For example, the user may "follow" a particular Twitter® account or be "friends" with another Facebook® account. These accounts have a "bio" or "profile" section that includes text-based information about the other user. Such text-based information about the other user can be analyzed to determine a plurality of interests associated with the user account.

A user or the one or more other users associated with the user can perform one or more online activities. For example, the user or one or more other users associated with the user may "tweet" a post on Twitter °, "re-tweet" a "tweet" that was posted on Twitter °, write a post on Facebook®, "like" a post that was posted in Facebook®, send an email, view an article, perform a search engine search, visit a particular website, etc. Such online activities include text-based information that can be analyzed to determine a plurality of interests associated with the user account.

Each instance of text-based information is analyzed to determine interests associated with the user account. An instance of text-based information is comprised of one or more words. Each word of the instance and/or combination of words (e.g., all n-grams or entity-resolved n-grams) is assigned a score that reflects the importance of the word with respect to the instance of text-based information. For example, each word and/or combination of words can be assigned a TF-IDF value or an IDF value.

The scores from each instance of text-based information are aggregated to assign an endorsement score to each particular word or combination of words. A word and/or combination of words can correspond to an interest. The endorsement score of a word and/or combination of words corresponds to an interest level for a particular interest.

The endorsement scores of interests associated with a user can be adjusted. For example, an endorsement score of an interest can be adjusted by a particular amount based on user engagement with the content feed. As another example, an endorsement score of an interest can be adjusted by a particular amount based on a similarity between a web document associated with the interest and a web document associated with a different interest. An endorsement score of an interest can also be adjusted by a particular amount based on a similarity between web documents associated with the interest and web documents associated with the different interest. An endorsement score of an interest can also be adjusted by a particular amount based on user engagement with an interest on a website. For example, an interest may appear as a subreddit title on the website Reddit® and have a particular number of subscribers to the subreddit. An endorsement score of an interest can be also adjusted by a particular amount based on whether a topic associated with the interest is trending. An endorsement score of an interest can also be adjusted by a particular amount based on meta keywords of a web document associated with the interest. An endorsement score of an interest can also be adjusted by a particular amount based on a curation score associated with the interest. An endorsement score of an interest can also be adjusted by a particular amount based on a feature data score associated with the interest. The endorsement score and associated adjustment amounts (i.e., interest indicators) are provided to a machine learning model that is trained to output a confidence value that indicates whether an interest is relevant to the user. Interests having a confidence value above a confidence threshold are determined to be interests that are relevant to a user.

An application is configured to generate a content feed that is comprised of one or more documents (e.g., web documents, advertisements, and/or synthesized content as well as links to sources of such content or other content, in which any such content can include text, images, videos, and/or other types of content) for the user based on the confidence values of one or more interests. Applying the disclosed techniques, the content feed can include online content that is likely to be relevant to the user.

The foregoing and other features and advantages of the disclosed techniques for providing an enhanced search to generate a feed based on a user's interests will be apparent from the following more particular description, as illustrated in the accompanying drawings.

System Embodiments for Implementing a Search and Feed Service

FIG. 1 is a block diagram illustrating an overview of an architecture of a system for providing a search and feed service in accordance with some embodiments. In one embodiment, a search and feed service 102 is delivered via the Internet 120 and communicates with an application executed on a client device as further described below with respect to FIG. 1.

As shown, various user devices, such as a laptop computer 132, a desktop computer 134, a smart phone 136, and a tablet 138 (e.g., and/or various other types of client/end user computing devices) that can execute an application, which can interact with one or more cloud-based services, are in communication with Internet 120 to access various web services provided by different servers or appliances 110A, 110B, . . . , 110C (e.g., which can each serve one or more web services or other cloud-based services).

For example, web service providers or other cloud service providers (e.g., provided using web servers, application (app) servers, or other servers or appliances) can provide various online content, delivered via websites or other web services that can similarly be delivered via applications executed on client devices (e.g., web browsers or other applications (apps)). Examples of such web services include websites that provide online content, such as news websites (e.g., websites for the NY Times®, Wall Street Journal®, Washington Post®, and/or other news websites), social networking websites (e.g., Facebook®, Google®, LinkedIn®, Twitter®, or other social network websites), merchant websites (e.g., Amazon®, Walmart®, or other merchant websites), or any other websites provided via websites/web services (e.g., that provide access to online content or other web services).

In some cases, these web services are also accessible to other web services or apps via APIs, such as representational state transfer (REST) APIs or other APIs. In one embodiment, public or commercially available APIs for one or more web services can be utilized to access information associated with a user for identifying potential interests to the user and/or to search for potential online content of interest to the user in accordance with various disclosed techniques as will be further described below.

In some implementations, the search and feed service can be implemented on a computer server or appliance (e.g., or using a set of computer servers and/or appliances) or as a cloud service, such as using Amazon Web Services (AWS), Google Cloud Services, IBM Cloud Services, or other cloud service providers. For example, search and feed service 102 can be implemented on one or more computer servers or appliance devices or can be implemented as a cloud service, such as using Google Cloud Services or another cloud service provider for cloud-based computing and storage services.

For example, the search and feed service can be implemented using various components that are stored in memory or other computer storage and executed on a processor(s) to perform the disclosed operations such as further described below with respect to FIG. 2.

Figure 2:
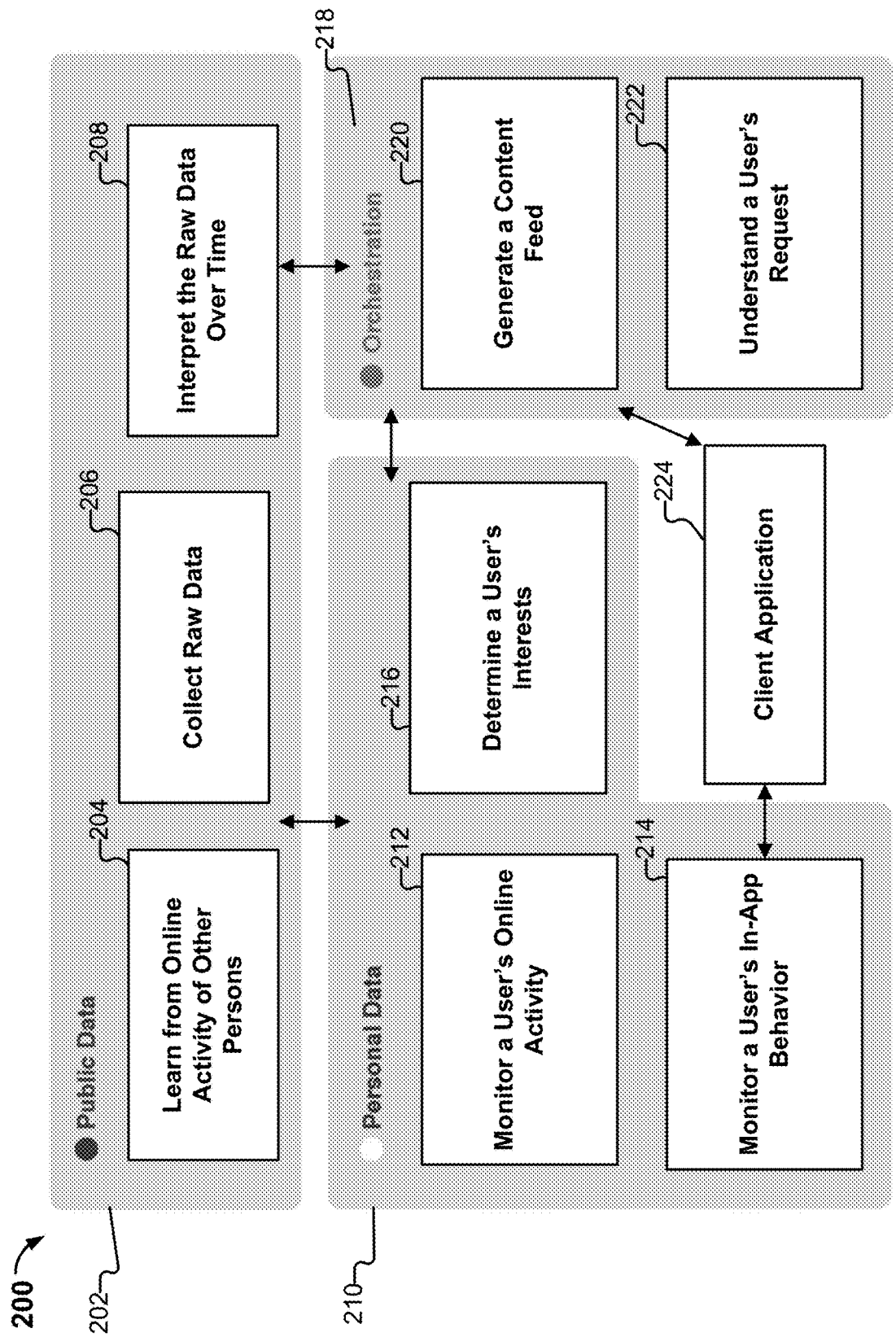
FIG. 2 is a block diagram illustrating a search and feed system in accordance with some embodiments.

FIG. 2 is a block diagram illustrating a search and feed system in accordance with some embodiments. In one embodiment, a search and feed system 200 includes components that are stored in memory or other computer storage and executed on a processor(s) for performing the disclosed techniques implementing the search and feed system as further described herein. For example, search and feed system 200 can provide an implementation of search and feed service 102 described above with respect to FIG. 1.

As shown in FIG. 2, search and feed system 200 includes a public data set of components 202 for collecting and processing public data, a personal data set of components 210 for collecting and processing personal data, and an orchestration set of components 218 for orchestrating searches and feed generation. Each of these components can interact with other components of the system to perform the disclosed techniques as shown and as further described below. As also shown in FIG. 2, a client application 224 is in communication with search and feed system 200 via orchestration component 218. For example, the client application can be implemented as an app for a smart phone or tablet (e.g., an Android®, iOS® app, or an app for another operating system (OS) platform) or an app for another computing device (e.g., a Windows® app or an app for another OS platform, such as a smart TV or other home/office computing device).

In one embodiment, public data set of components 202 for collecting and processing public data includes a component 204 that learns from online activity of other persons. As also shown in FIG. 2, public data set of components 202 includes a component 206 that collects raw data (e.g., online content from various web services) and a component 208 that interprets the raw data over time. Each of the public data set of components 202 will be further described below.

In one embodiment, personal data set of components 210 for processing personal data includes a component 212 that monitors a user's online activity and a component 214 that monitors a user's in-app behavior (e.g., monitors a user's activity within/while using the app, such as client application 224). As also shown in FIG. 2, personal data set of components 210 includes a component 216 that determines a user's interests (e.g., learns a user's interests). Each of the personal data set of components 210 will be further described below.

In one embodiment, orchestration set of components 218 for orchestrating searches and feed generation includes a component 220 that generates a content feed (e.g., based on a user's interests). As also shown in FIG. 2, orchestration set of components 218 includes a component 222 that processes and understands a user's request(s). Each of the orchestration set of components 218 will be further described below.

Another embodiment for implementing the components of the search and feed service to perform the disclosed operations is described below with respect to FIG. 3.

Figure 3:
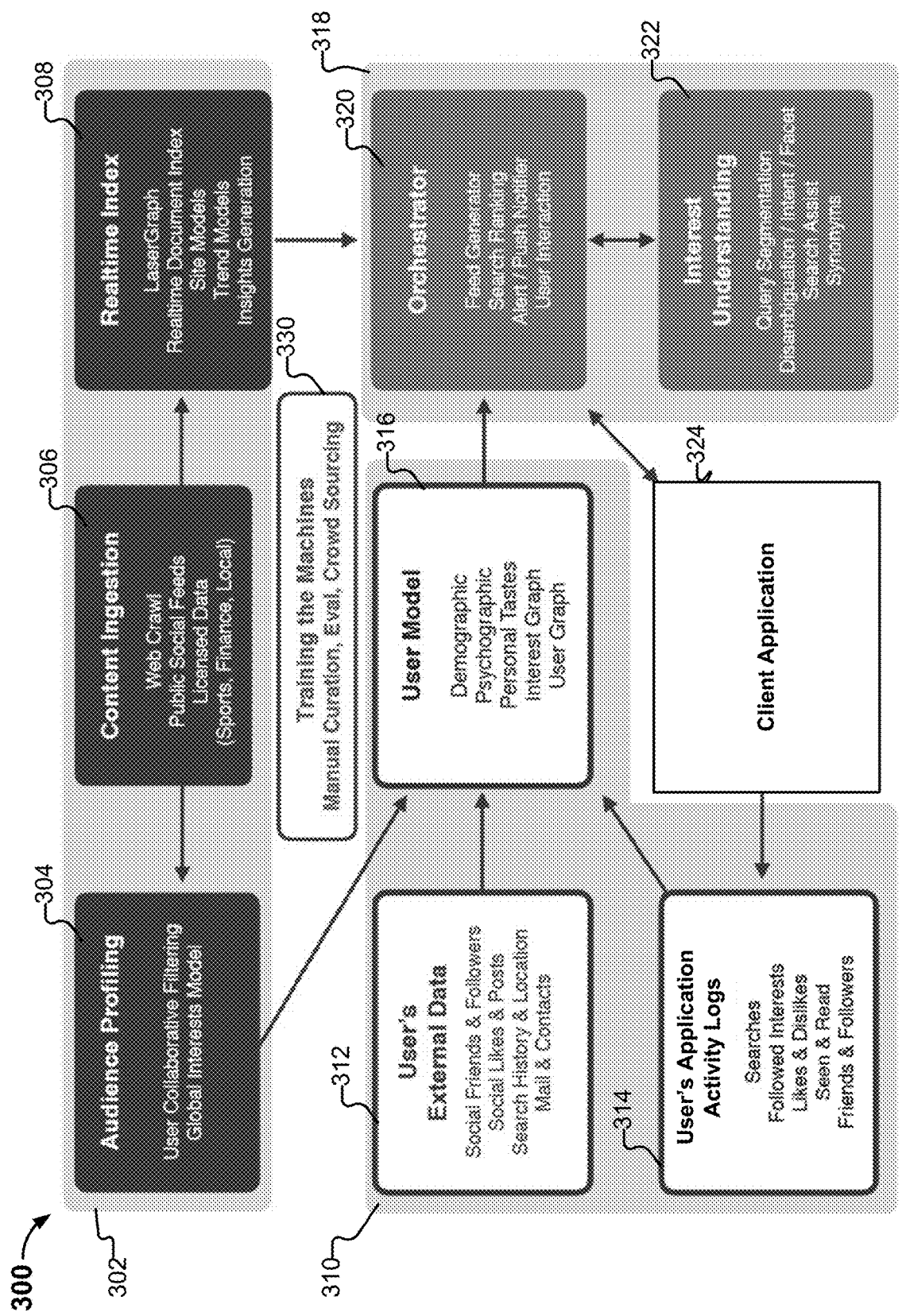
FIG. 3 is another block diagram illustrating a search and feed system in accordance with some embodiments.

FIG. 3 is another block diagram illustrating a search and feed system in accordance with some embodiments. In one embodiment, a search and feed system 300 includes components that are stored in memory or other computer storage and executed on a processor(s) for performing the disclosed techniques implementing the search and feed system as further described herein. For example, search and feed system 300 can provide an implementation of search and feed service 102 described above with respect to FIG. 1 and search and feed system 200 described above with respect to FIG. 2.

As shown in FIG. 3, search and feed system 300 includes a public data set of components 302 for collecting and processing public data, a personal data set of components 310 for collecting and processing personal data, an orchestration set of components 318 for orchestrating searches and feed generation, and a machine learning component 330 for training the machines. Each of these components can interact with one or more of the other components of the system to perform the disclosed techniques as shown and as further described below. As also shown in FIG. 3, a client application 324 is in communication with search and feed system 300 via orchestration component 318. For example, the client application can be implemented as an app for a smart phone or tablet (e.g., an Android®, iOS® app, or an app for another operating system (OS) platform) or an app for another computing device (e.g., a Windows® app or an app for another OS platform, such as a smart TV or other home/office computing device) as similarly described above.

In one embodiment, public data set of components 302 include an audience profiling component 304 that learns from online activity associated with other persons implemented using various subcomponents including user collaborative filtering and a global interests model as further described below. As also shown in FIG. 3, components 302 include a content ingestion component 306 that collects raw data (e.g., online content from various web services) using web crawlers to crawl websites and public social feeds (e.g., public social feeds of users from Facebook, LinkedIn, and/or Twitter), and licensed data (e.g., licensed data from sports, finance, local, and/or news feeds, and/or licensed data feeds from other sources including social networking sites such as LinkedIn and/or Twitter). As also shown, components 302 include a realtime index component 308 that interprets the raw data over time using and/or generating and updating various subcomponents including a LaserGraph, a Realtime Document Index (RDI), site models, trend models, and insights generation as further described below. Each of the components and respective subcomponents of public data set of components 302 will be further described below.

In one embodiment, personal data set of components 310 include a user's external data component 312 that monitors a user's online activity including, for example, social friends and followers, social likes and posts, search history and location, and/or mail and contacts (e.g., based on public access and/or user authorized access privileges granted to the app/service). As also shown in FIG. 3, components 310 include a user's application activity logs component 314 that logs their in-app behavior (e.g., logs a user's monitored activity within/while using the app, such as client application 324) including, for example, searches, followed interests, likes and dislikes, seen and read, and/or friends and followers. As also shown, components 310 include a user model component 316 that learns a user's interests based on, for example, demographic information, psychographic information, personal tastes (e.g., user preferences), an interest graph, and a user graph. Each of the components and respective subcomponents of personal data set of components 310 will be further described below.

In one embodiment, orchestration set of components 318 include an orchestrator component 320 that composes a feed (e.g., generates a content feed based on the user's interests and results of documents that match the user's interests) using a feed generator based on a search ranking that can be determined based on a document score and a user signal (e.g., based on monitored user activity and user feedback) and can also utilize an alert/push notifier (e.g., to push content/the content feed and alert the user of new content being available and/or pushed to the user's client app). As also shown in FIG. 3, components 318 include an interest understanding component 322 that processes and understands a user's request(s) based on, for example, query segmentation, disambiguation/intent/face, search assist, and synonyms. Each of the components and respective subcomponents of orchestration set of components 318 will be further described below.

In an example implementation, various of the components of the search and feed system can be implemented using open source or commercially available solutions (e.g., the realtime index can be implemented with underlying storage as Cloud Bigtable using Google's NoSQL Big Data database service provided by the Google Cloud Platform) and various other components of the search and feed system (e.g., orchestrator component 320, interest understanding component 322, and/or other components) can be implemented using a high-level programming language, such as Go, C, Java, or another high-level programming language or scripting language, such as JavaScript or another scripting language. In some implementations, one or more of these components can be performed by another device or components such that the public data set of components 302, private data set of components 310, and the orchestration set of components 318 (e.g., and/or respective subcomponents) can be performed using another device or components, which can provide respective input to the search and feed system. As another example implementation, various components can be implemented as a common component, and/or various other components or other modular designs can be similarly implemented to provide the disclosed techniques for the search and feed system.

As further described below, various processes can be performed using the search and feed system system/service to implement the various search and feed system techniques as further described below.

Validating Interests

Figure 4:
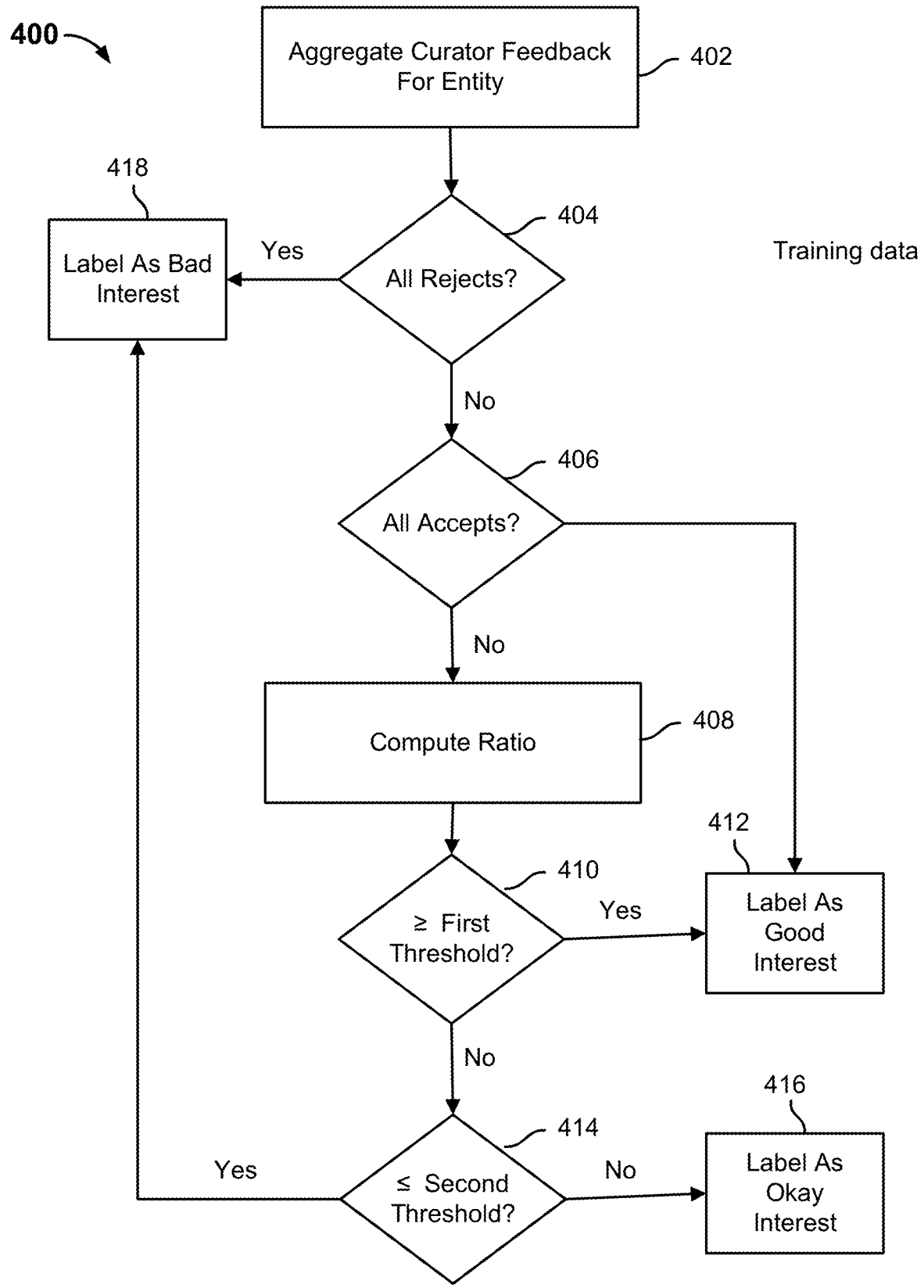
FIG. 4 is a flow chart illustrating a process for assigning a label to an entity in accordance with some embodiments.

FIG. 4 is a flow chart illustrating a process for assigning a label to an entity in accordance with some embodiments. Process 400 may be implemented on a search and feed service, such as search and feed service 102.

At 402, a set of curator feedback associated with an entity is aggregated. For example, a plurality of curators may indicate that an entity is to be accepted or rejected as an interest. A plurality of curators may also indicate that an entity should never be identified as an interest. For example, a curator may "reject" an entity as an interest because the curator does not think the entity should be an interest. The curator may have a stronger objection and indicate that the entity should never be an interest. The number of "accepts," "rejects," and "never" for an entity is aggregated.

At 404, it is determined whether the all of the curator feedback indicates that entity is to be rejected. In the event all of the curator feedback does not indicate that the entity is to be rejected as an interest, process 400 proceeds to 406. In the event all of the curator feedback indicates that the entity is to be rejected as an interest, process 400 proceeds to 418.

At 406, it is determined whether the all of the curator feedback indicates that entity is to be accepted. In the event all of the curator feedback does not indicate that the entity is to be accepted as an interest, process 400 proceeds to 408. In the event all of the user feedback indicates that the entity is to be accepted as an interest, process 400 proceeds to 412.

At 408, a ratio of the "accepts" to the "rejects" is computed. In some embodiments, the ratio is computed as $$\frac{(\text{accepts} - \text{rejects} - kN)}{(\text{accepts} + \text{rejects} + kN)}$$

where k is a constant (e.g., 5) and N is the number of times a curator indicated that the entity should never be an interest.

At 410, it is determined whether the ratio is above a first threshold. In some embodiments, the first threshold is a positive number between 0 and 1. In the event the ratio is greater than or equal to the first threshold, process 400 proceeds to 412. In the event the ratio is less than the first threshold, process 400 proceeds to 414.

At 412, the entity is labeled as a "good interest." In some embodiments, a "good interest" label indicates that a threshold number of users may be interested in viewing web documents associated with the interest. In some embodiments, in the event all of the curator feedback indicates the entity is to be accepted, the entity is assigned a curation score of 1. In other embodiments, in the event some of the curator feedback indicates the entity is to be accepted and some of the curator feedback indicates the entity is to be rejected, the computed ratio is the curation score for the entity.

At 414, it is determined whether the ratio is below a second threshold. The second threshold is a value that is less than the first threshold. In some embodiments, the second threshold is a negative number between −1 and 0. In the event the ratio is less than or equal to the second threshold, process 400 proceeds to 418. In the event the ratio is greater than the second threshold and less than the first threshold, process 400 proceeds to 416.

At 416, the entity is labeled as an "okay interest." In some embodiments, an "okay interest" label indicates that at least one user of the set of users may be interested in viewing web documents associated with the interest.

At 418, the entity is labeled as a "bad interest." Entities are assigned a label to filter out "bad interests" from being recommended to users. A "bad interest" refers to an entity that may be malformed (e.g., "rocket"), too vague (e.g., "wood"), and/or of such nature that no user could possibly be interested (e.g., "2017"). An entity with a "bad interest" label is an objective label that indicates no user is likely to be interested in the entity. An entity with a "bad interest" label is filtered from a set of potential interests for a user. In some embodiments, in the event all of the curator feedback indicates the entity is to be rejected, the entity is assigned a curation score of −1. In other embodiments, in the event some of the curator feedback indicates the entity is to be accepted and some of the curator feedback indicates the entity is to be rejected, the computed ratio is the curation score for the entity.

In some embodiments, an entity with a probability above a good interest probability threshold is added/retained to a set of possible interests. The labels associated with an interest may be included as input to a machine learning model configured to determine whether the interest is a good interest for a particular user.

Figure 5:
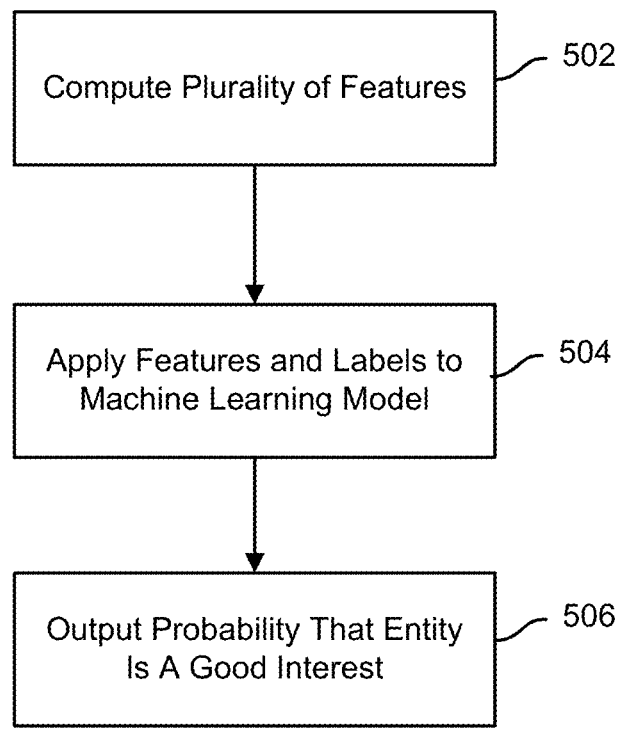
FIG. 5 is a flow chart illustrating a process for determining a probability that an entity is a good interest in accordance with some embodiments.

FIG. 5 is a flow chart illustrating a process for determining a probability that an entity is a good interest in accordance with some embodiments. Process 500 may be implemented on a search and feed service, such as search and feed service 102.

At 502, a plurality of features associated with an entity are computed.

In some embodiments, a set of feature data can be computed for an entity. For example, an inverse document frequency (IDF) may be computed for an entity. An entity with a low IDF score (e.g., below a IDF low score threshold (e.g., <4)) may indicate the entity is a bad interest. An entity with a high IDF score (e.g., above a IDF high score threshold (e.g., >4)) may indicate that the entity is a good interest.

In some embodiments, a IDF may be computed for a plurality of entities that resolve to a single entity (e.g., "Steven Wozniak" may resolve to "Steve Wozniak."). For example, an entity may have a plurality of synonyms.

In some embodiments, a link probability may be computed for an entity. The link probability indicates for an entity in an information website (e.g., Wikipedia), the percentage that a string of the entity points to the entity's page of the information website. For example, the string "water" may be used throughout the information website, but only a couple of instances of the string "water" includes a link to the "water" page of the information website. An entity with a low link probability percentage may indicate that the entity is a bad interest. For example, an entity with a link probability greater than 0.8 may indicate that the entity is a good interest.

In some embodiments, a views over inlinks value may be computed for an entity. For example, an information website (e.g., Wikipedia) may determine statistics about an entity page (e.g., # of views per hour, # views per day, % increase/decrease of views day-to-day, % increase/decrease of views week-to-week, etc.). In some embodiments, a moving average is computed for an entity. An entity with a low views over inlinks value (e.g., below a threshold views over inlinks value) may indicate that the entity is a bad interest because a small percentage of the information website's users are interested in viewing information about the entity. For example, an entity with a views over inlinks value of 600 may indicate that the entity is a bad interest.

In some embodiments, a ratio of the number of inlinks of the entity's page of the information website to the number of outlinks of the entity's page of the information website may be computed. An inlink is an embedded link within a different web document that references the web document. An outlink is an embedded link within the web document that references a different web document. An entity with a lot of inlinks (e.g., above a threshold number of inlinks) may indicate that the entity is a bad interest because the entity may be a general concept to which users are not interested in following. For example, an entity with a ratio of 5 may indicate that the entity is a bad interest.

In some embodiments, a frequency value at which the first letter of the entity is in lowercase across the corpus of documents may be computed. An entity with a high lowercase frequency value (e.g., above a lowercase frequency threshold) may indicate that entity is a bad interest because the entity is likely not a proper noun. In some embodiments, the first letter of an entity is capitalized because it is the entity is the first word of a sentence. Entities where the only instances of the first letter of the entity being capitalized is when the entity is the first word of a sentence indicates that the entity is not a proper noun and less likely to be a good interest than if the first letter of the entity was always capitalized. For example, an entity with a lowercase frequency value greater than 0.3 may indicate that the entity is a bad interest.

In some embodiments, the log of the number of subscribers for a page associated with the entity may be computed. For example, a subreddit page associated with the entity may exist. The log of the number of users subscribed to the subreddit page may be computed. For example, an entity with a log of the number of subscribers value that is greater than 10 may indicate the entity is a good interest.

In some embodiments, the number of words in the interest may be computed.

In some embodiments, a logistic regression of the computed features is computed. In some embodiments, the logistic regression is computed as $$\frac{1}{1+e^{-t}}$$

where $t=k_0+k_1/f_1+k_2 f_2+ \ldots +k_n f_n$, where k is a weighted value and f is a computed feature value.

At 504, the plurality of computed features and labels are applied to a machine learning model that is computed to output a probability indicating that the entity is a good interest. In some embodiments, some or all of the features described above are applied to the machine learning model. In some embodiments, the computed logistic regression value is applied to the machine learning model. The machine learning model may implement logistic regression, logical regression, support vector machine, etc.

In some embodiments, the machine learning model is trained with a set of positive examples that indicate an entity is a good interest and a set of negative examples that an entity is not a good interest. A positive example includes a combination of the computed features that indicate an entity that is a good interest. A negative example includes a combination of the computed features that indicate that the entity is not a good interest.

In some embodiments, the machine learning model is trained with a set of positive examples that indicate an entity is a bad interest and a set of negative examples that an entity is not a bad interest. A positive example includes a combination of the computed features that indicate an entity that is a bad interest. A negative example includes a combination of the computed features that indicate that the entity is not a bad interest.

At 506, a probability indicating that the entity is a good interest is outputted. In some embodiments, an entity with a probability below a bad interest probability threshold is removed/excluded from a set of possible interests.

User Interest Modeling Embodiments

Figure 6A:
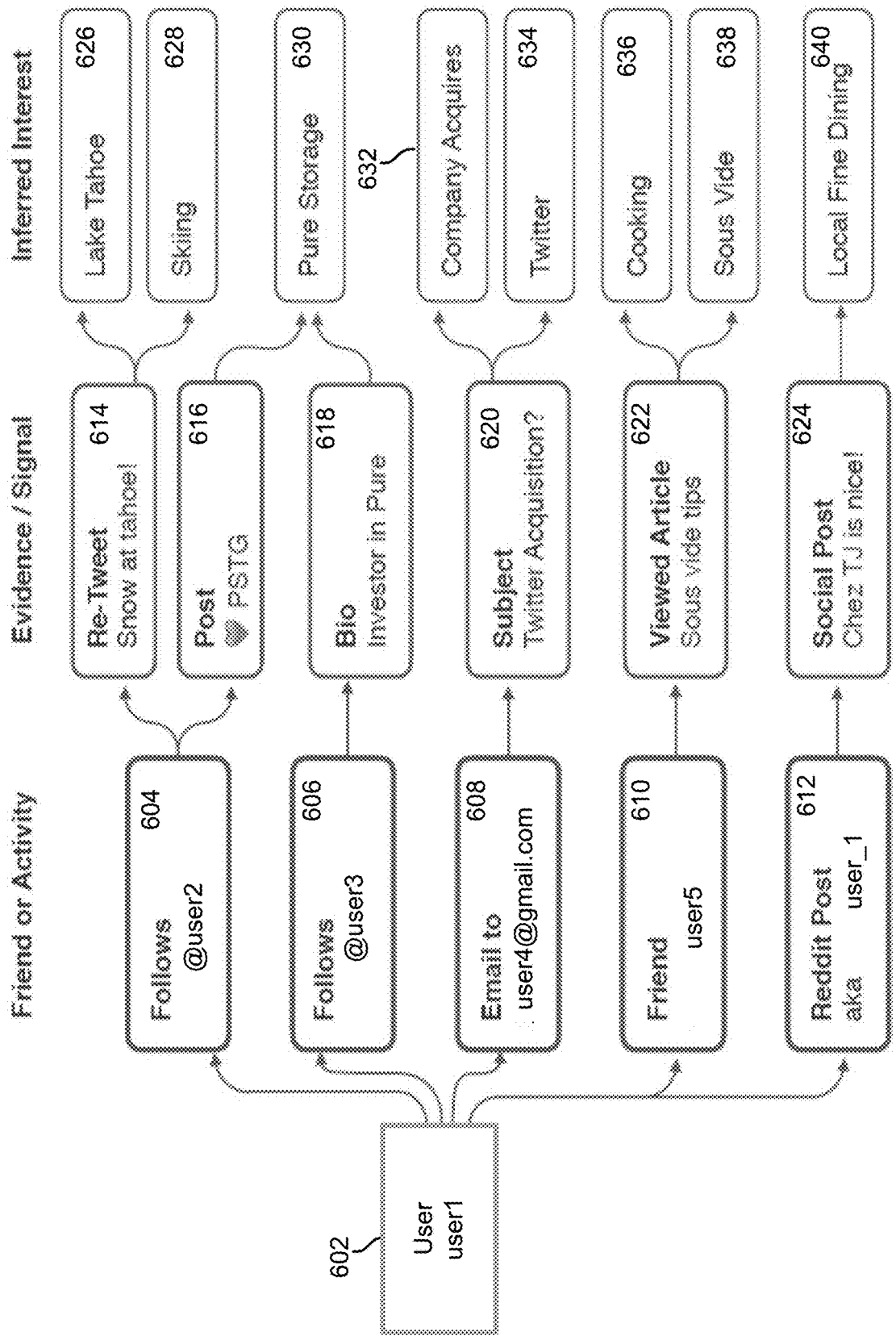
FIG. 6A is an example of online content associated with a user account associated with a user in accordance with some embodiments.

FIG. 6A is an example of online content associated with a user account associated with a user in accordance with some embodiments. Examples of online content (i.e., web documents associated with a user) include a social media account (e.g., a Twitter® account, a Facebook® account, a Google® account, a LinkedIn® account, etc.), a personal blog site (e.g., Tumbler®), search query history, Internet history, etc.

In the example shown, a user is associated with a user account 602 "user1." User account 602 is associated with Twitter® account 604 "@user2" and Twitter® account 606 because user account 602 has followed those Twitter® accounts. User account 602 is associated with email account 608 because user account 602 has sent an email to email account 608. User account 602 is associated with Facebook® account 610 because user account 602 is friends with Facebook® account 610 on Facebook®. User account 602 is associated with Reddit® account 612 because Reddit® account 612 is the user's Reddit® account. One or more online accounts associated with user account 602 can be determined after the application receives OAuth information or any other information associated with an authorization standard, from the user.

One or more interests associated with user account 602 can be determined from the online content associated with user account 602. The online content includes text-based information, such as text information associated with the user's one or more social media accounts, text information associated with one or more social media accounts of one or more other users associated with the user account, text information associated with one or more online activities associated with the user account, or text information associated with one or more online activities associated with the one or more other users associated with the user account.

In the example shown, Twitter account 604 has re-tweeted a tweet 614 and posted a post 616. Based on the text information of tweet 614, it can be determined that Twitter® account 604 has an interest 626 in Lake Tahoe. Since user account 602 is associated with Twitter® account 604, it can be determined that user account 602 also has an interest 626 in Lake Tahoe. Based on the text information of post 616, it can be determined that Twitter® account 604 has an interest 628 in skiing. Since user account 602 is associated with Twitter® account 604, it can be determined that user account 602 also has an interest 628 in skiing.

In the example shown, Twitter® account 606 has bio information 618. Based on the text information of bio information 618, it can be determined that Twitter® account 606 has an interest 630 in Pure Storage®. Since user account 602 is associated with Twitter® account 606, it can be determined that user account 602 also has an interest 630 in Pure Storage®.

In the example shown, user account 602 has sent an email to email account 608. The email includes a subject header 620. Based on the text information of subject header 620, it can be determined that email account 608 has an interest 632 in company acquires and/or an interest 634 in Twitter®. Since user account 602 is associated with email account 608, it can be determined that user account 602 also has an interest 632 in company acquires and/or an interest 634 in Twitter®.

In the example shown, user account 602 is friends with Facebook® account 610 on Facebook®. A user associated with Facebook® account 610 has viewed an article 622. Based on the text information of article 622, it can be determined that Facebook® account 610 has an interest 636 in cooking and/or an interest 638 in sous vide. Since user account 602 is associated with Facebook® account 610, it can be determined that user account 602 also has an interest 636 in cooking and/or an interest 636 in sous vide.

In the example shown, user account 602 is associated Reddit® account 612. The user of Reddit® account 612, i.e., the user of user account 602, has posted a post 624 on Reddit®. Based on the text information of post 624, it can be determined that Reddit® account 612 has an interest 640 in local fine dining. Since user account 602 is associated with Reddit® account 612, it can be determined that user account 602 also has an interest 640 in local fine dining.

Figure 6B:
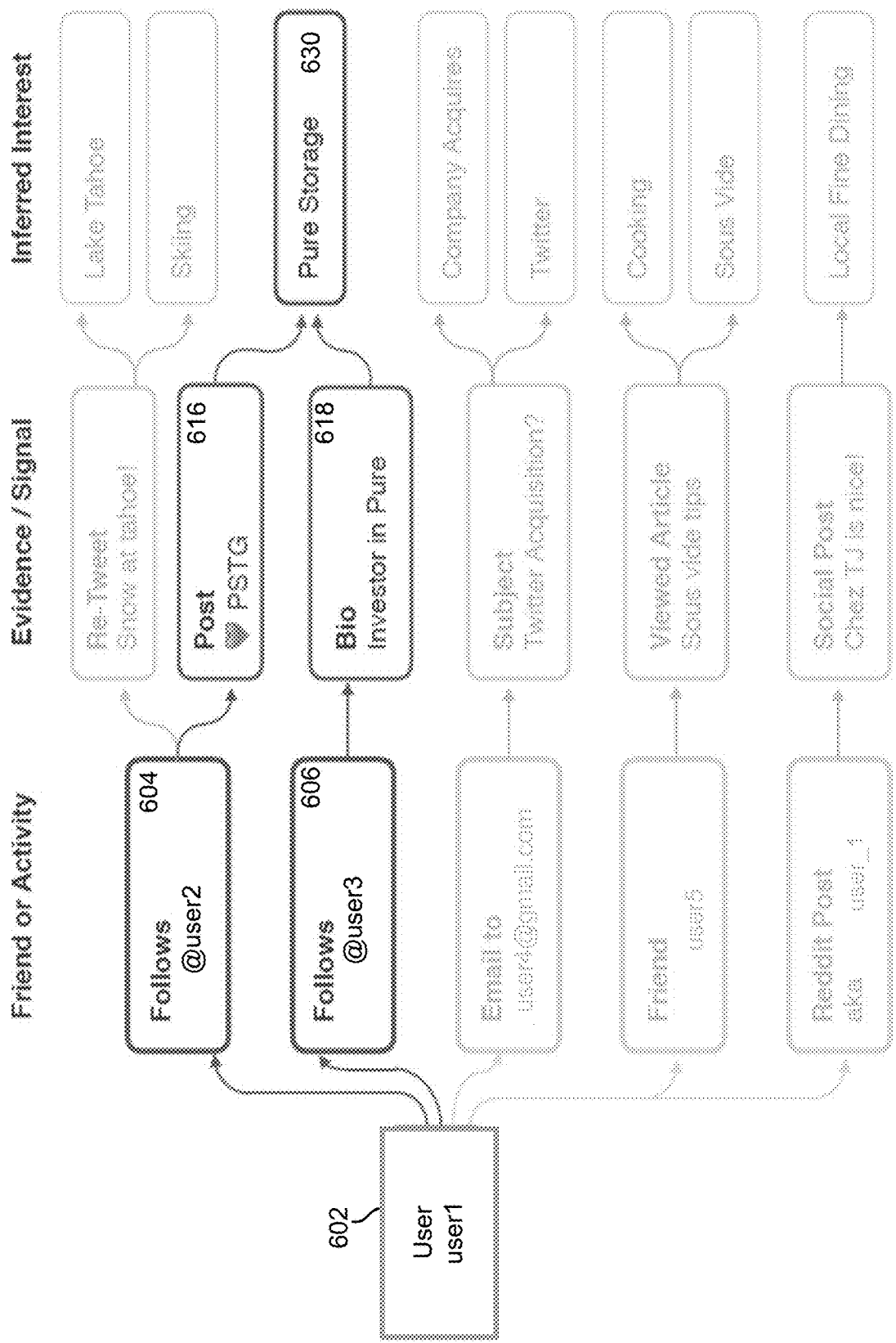
FIG. 6B is an example of a cross-referenced interest in accordance with some embodiments.

FIG. 6B is an example of a cross-referenced interest in accordance with some embodiments. A cross-referenced interest is an interest that is associated with a user account and one or more other user accounts or an interest that is associated with at least two of the one or more other user accounts. In the example shown, user account 602 is associated with Twitter® account 604 and Twitter® account 606. Both Twitter® accounts 604, 606 are associated with text-based information that indicates a common interest 630 in Pure Storage®. In some embodiments, an endorsement score associated with an interest is increased when an interest is cross-referenced.

Figure 7:
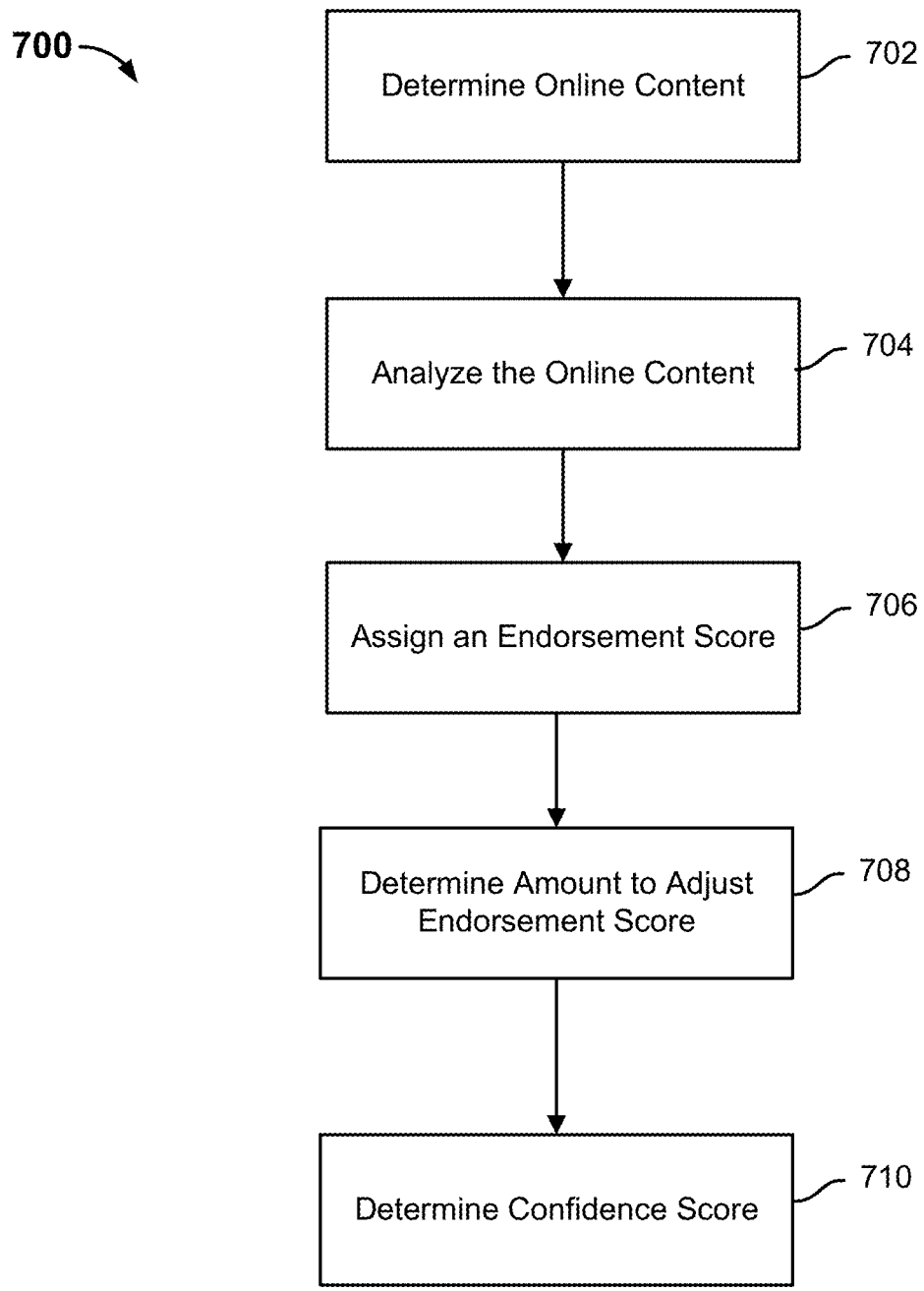
FIG. 7 is a flow diagram illustrating a process for modeling user interests in accordance with some embodiments.

FIG. 7 is a flow diagram illustrating a process for modeling user interests in accordance with some embodiments. Process 700 may be implemented on a search and feed service, such as search and feed service 102. At 702, online content associated with a user account associated with a user is determined (i.e., web documents associated with a user). In some embodiments, the online content includes text-based information that includes at least one of text information associated with the user's one or more online accounts, text information associated with one or more online accounts of one or more other users associated with the user account, text information associated with one or more online activities associated with the user account, or text information associated with one or more online activities associated with the one or more users associated with the user account.

At 704, the online content is analyzed to determine a plurality of interests associated with the user account. In some embodiments, text-based information associated with the online content is analyzed. An instance of text-based information is comprised of one or more words. Each word and/or combination of words of the instance is assigned a score that reflects the importance of the word/combination of words with respect to the instance of text-based information. For example, each word/combination of words can be assigned a TF-IDF value and/or a IDF value. In some cases, the online content includes an embedded link. The text-based information associated with the embedded link is also analyzed. For example, online content may include an embedded link to a news article. Text-based information associated with the news article is analyzed. Each word/combination of words within the news article can be assigned a TF-IDF value and/or a IDF value. In some embodiments, the score is normalized to a value between 0 and 1. A word/combination of words with a score above a threshold value is determined to be an interest associated with the user account.

In other embodiments, metadata or meta keywords associated with the online content is analyzed to determine a plurality of interests associated with the user account.

At 706, an endorsement score is assigned to each interest determined to be an interest associated with the user account. An interest associated with the user account can be determined to be an interest from a plurality of sources. For example, an online account associated with the user may share an article about a particular topic. An online account of one or more other users associated with the user account may post a comment on social media about the particular topic. An analysis of the text-based information associated with the article and the comment provide a score to each of the words/combination of words in the article and the comment. The words/combination of words with scores above a threshold value can be determined to be an interest associated with the user account.

In some embodiments, the scores for a particular word/combination of words from each source are aggregated to produce an endorsement score. For example, an endorsement score is assigned to interest 626 and interest 630. In the example shown, the endorsement score associated with interest 626 is produced from tweet 614. In contrast, the endorsement score associated with interest 630 is aggregated from a plurality of sources, i.e., post 616 and bio information 618.

In other embodiments, the word scores from each source are weighted based on the source of the word and aggregated to produce the endorsement score. For example, a word from the article shared by the user may be weighted with a higher value than the same word from the comment on social media posted by one or more other users associated with the user account. For example, the word from the article shared by the user may be given a weight of 1.0 and the same word from the comment on social media posted by one or more other users associated with the user account may be given a weight of 0.5. In some embodiments, an aggregated word score is capped, such that a word corresponding to an interest from multiple sources is capped at a maximum value.

At 708, an amount to adjust the endorsement score is determined. In some embodiments, an endorsement score of an interest can be adjusted by a particular amount based on user engagement with the content feed. In another embodiment, the endorsement score of an interest can be adjusted by a particular amount based on a similarity between a web document associated with the interest and a web document associated with a different interest. In another embodiment, the endorsement score of an interest can be adjusted by a particular amount based on a similarity between web documents associated with the interest and web documents associated with the different interest. In another embodiment, the endorsement score of an interest can also be adjusted by a particular amount based on user engagement with an interest on a website. For example, an interest may appear as a subreddit on the website Reddit® and have a particular number of subscribers to the subreddit. In another embodiment, the endorsement score of an interest can be also adjusted by a particular amount based on whether a topic associated with the interest is trending. In another embodiment, the endorsement score of an interest can also be adjusted by a particular amount based on meta keywords of a web document associated with the interest. In another embodiment, the endorsement score of an interest can be also be adjusted based on a curation score associated with the interest. In another embodiment, the endorsement score of an interest can also be adjusted based on good interest probability value. In another embodiment, the curation score associated with the interest and the good interest probability value are adjusted based on each other and the adjusted score and adjusted value are used to adjust the endorsement score.

At 710, a confidence score is determined. The endorsement score and associated adjustment amounts (i.e., interest indicators) are provided to a machine learning model that is trained to output a confidence value that indicates whether an interest is relevant to the user. The machine learning model can be implemented using machine-learning based classifiers, such as neural networks, decision trees, support vector machines, etc. A training set of interests with corresponding endorsement scores and amounts to adjust the endorsement score are used as training data. The training data is sent to a machine learning model to adapt the classifier. For example, the weights of a neural network are adjusted to establish a model that receives an endorsement score and associated amounts to adjust the endorsement score and outputs a confidence value (e.g. a number between 0 and 1) that indicates whether an interest is relevant to the user.

Interests having a confidence value above a confidence threshold are determined to be interests that are relevant to a user. The plurality of interests are ranked based on the confidence score associated with each of the plurality of interests. An application is configured to generate a content feed for the user based on the confidence scores. For example, the content feed can include one or more web documents (e.g., articles, sponsored content, advertisements, social media posts, online video content, online audio content, etc.) that is associated with the plurality of ranked interests. In some embodiments, the content feed is comprised of one or more web documents that is associated with the plurality of interests with a confidence score above a certain threshold. In some embodiments, the certain threshold can be a threshold confidence score, a top percentage of interests (e.g., top 10%), a top tier of interests (e.g., top 20 interests), etc.

Figure 8:
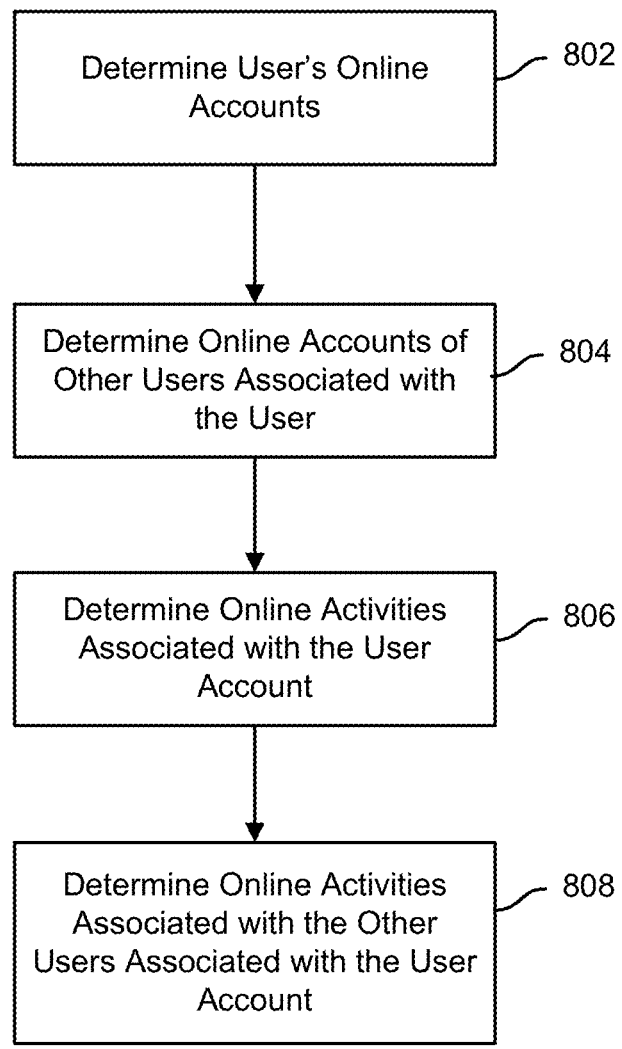
FIG. 8 is a flow diagram illustrating a process for determining online content associated with a user account associated with a user in accordance with some embodiments.

FIG. 8 is a flow diagram illustrating a process for determining online content associated with a user account associated with a user in accordance with some embodiments. In some embodiments, process 800 can be used to perform part or all of step 702.

At 802, one or more online user accounts of the user are determined. For example, a user can have one or more social media accounts, one or more email accounts, one or more blogging sites, etc. The one or more online user accounts associated with the user can be accessed using OAuth or another authorization standard to allow the system to determine the user's online activities associated with such online user accounts as further described below.

At 804, one or more online accounts of other users associated with the user account are determined. For example, a user may be "friends," "follow" other users, or be "followed" on a social media platform. A "friend" or a "follower/followee" on a social media platform can be determined to be an online account of another user that is associated with the user account. One or more online accounts of other users associated with the user account can be determined from an address or contact file. One or more online accounts of other users associated with the user account can be determined if the user interacts with their online accounts.

At 806, one or more online activities associated with the user account are determined. For example, a user can post a comment on a social media account, share an article via social media, email a contact, attach a file (e.g., image file, audio file, or video file) to an email, include a file (e.g., image file, audio file, or video file) in an online posting, perform a search query, visit a particular website, etc.

At 808, one or more online activities associated with the one or more online accounts of other users associated with the user account are determined. For example, the one or more other users can post a comment on a social media account, share an article via social media, email a contact, attach a file (e.g., image file, audio file, or video file) to an email, include a file (e.g., image file, audio file, or video file) in an online posting, perform a search query, visit a particular website, etc.

For example, the above-described process can be performed to allow the system to generate a user interest graph, such as the example of online content associated with a user account associated with a user as shown in FIG. 6A.

Figure 9:
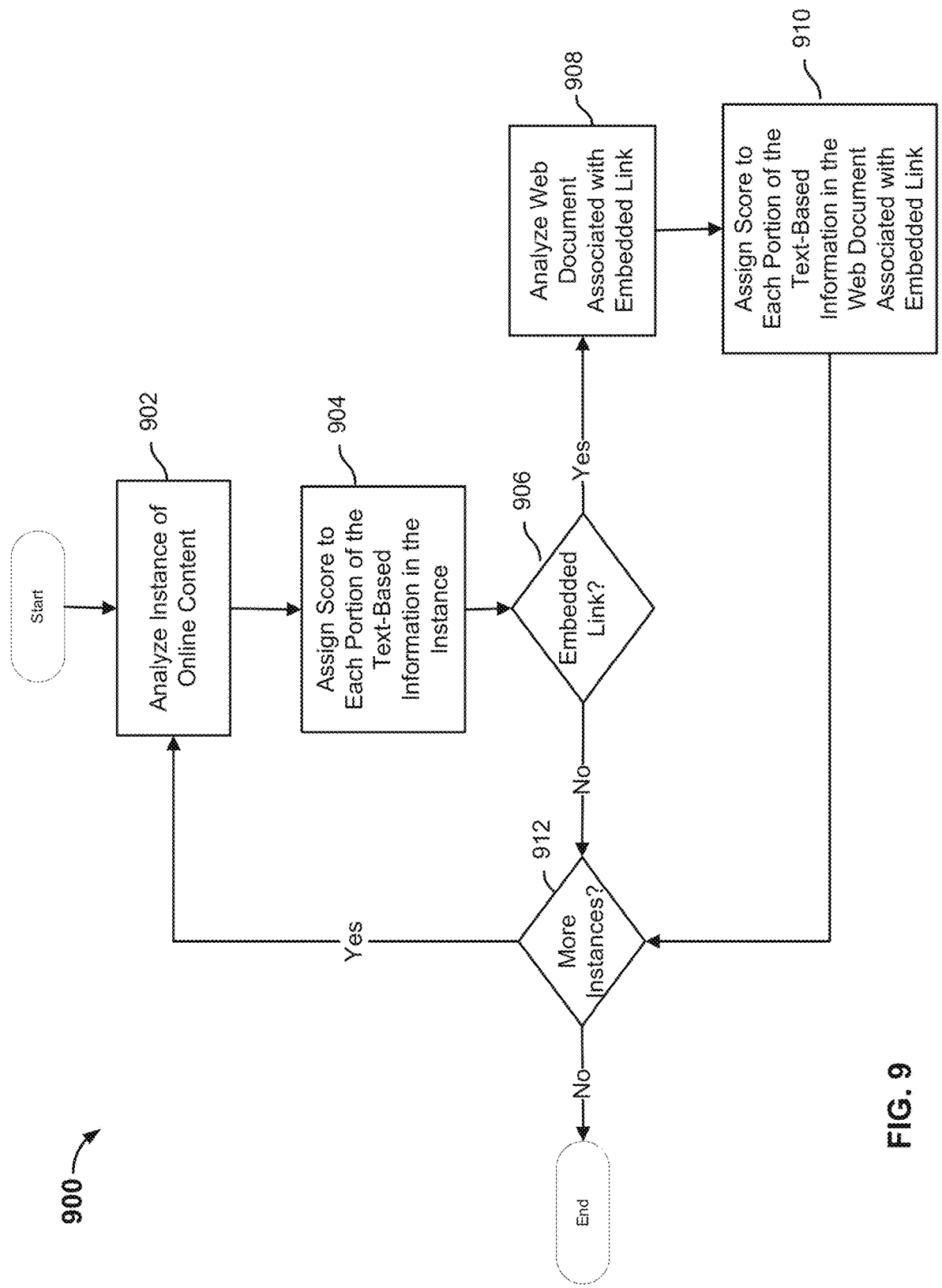
FIG. 9 is a flow diagram illustrating an embodiment of a process for analyzing online content in accordance with some embodiments.

FIG. 9 is a flow diagram illustrating an embodiment of a process for analyzing online content in accordance with some embodiments. In some embodiments, process 900 can be used to perform part or all of step 704.

At 902, an instance of online content is analyzed. In some embodiments, the online content includes text-based information. Text-based information can include one or more words, one or more hashtags, one or more emojis, one or more acronyms, one or more abbreviations, an embedded link, metadata, etc. The text-based information can be broken down into individual parts or phrases. For example, a comment on social media may be a long paragraph. Portions of the comment can be broken down into individual words while other portions of the comment can be grouped together, e.g., a phrase or slogan. In other embodiments, the online content includes non-text-based information, such as an image file, an audio file, or a video file.

At 904, a score is assigned to each portion of the text-based information in the instance. In some embodiments, the score is based on a location of a portion of the text-based information in the instance. For example, a portion of text-based information may be given a higher score or a higher weight if it appears at the top portion of an article than the same portion of text-based information would be given if it appeared at the bottom portion of the article. In other embodiments, the score is based on a term frequency-inverse document frequency value. In other embodiments, the score is based on a combination of a location of a portion of the text-based information in the instance and the term frequency-inverse document frequency value for that portion.

At 906, it is determined whether an embedded link is included in the text-based information. In the event an embedded link is included in the text-based information, the process proceeds to step 908. In the event an embedded link is not included in the text-based information, the process proceeds to step 912.

At 908, the web document associated with the embedded link is analyzed. In some embodiments, the web document associated with the embedded link includes text-based information. The text-based information can be broken down into individual parts or phrases. Portions of the comment can be broken down into individual words while other portions of the comment can be grouped together, e.g., a phrase or entity name. In other embodiments, the online content includes non-text-based information, such as an image file, an audio file, or a video file.

At 910, a score is assigned to each portion of the text-based information in the web document associated with the embedded link. In some embodiments, the score is based on a location of a portion of the text-based information in the instance. For example, a portion of text-based information may be given a higher score or a higher weight if it appears at the top portion of an article associated with the embedded link than the same portion of text-based information would be given if it appeared at the bottom portion of the article associated with the embedded link. In other embodiments, the score is based on a term frequency-inverse document frequency value. In other embodiments, the score is based on a combination of a location of a portion of the text-based information in the instance and the term frequency-inverse document frequency value for that portion.

At 912, it is determined whether there are more instances of online content. In the event there are more instances of online content, the process proceeds to step 902. In the event there are no more instances of online content, the process ends.

Figure 10B:
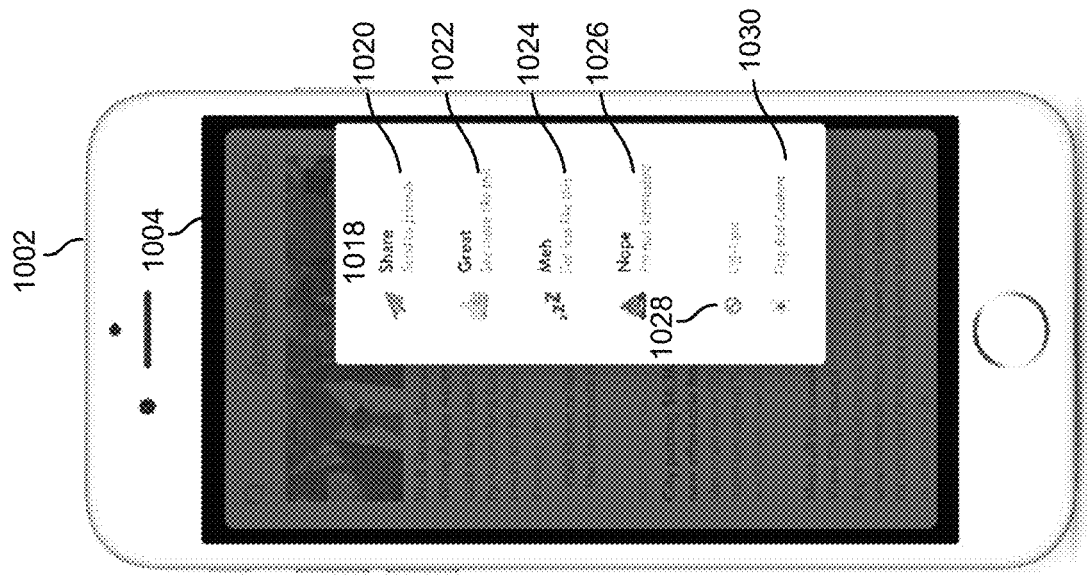
FIG. 10B another block diagram illustrating a user interface of a client application of a system for providing a content feed in accordance with some embodiments.
Figure 10A:
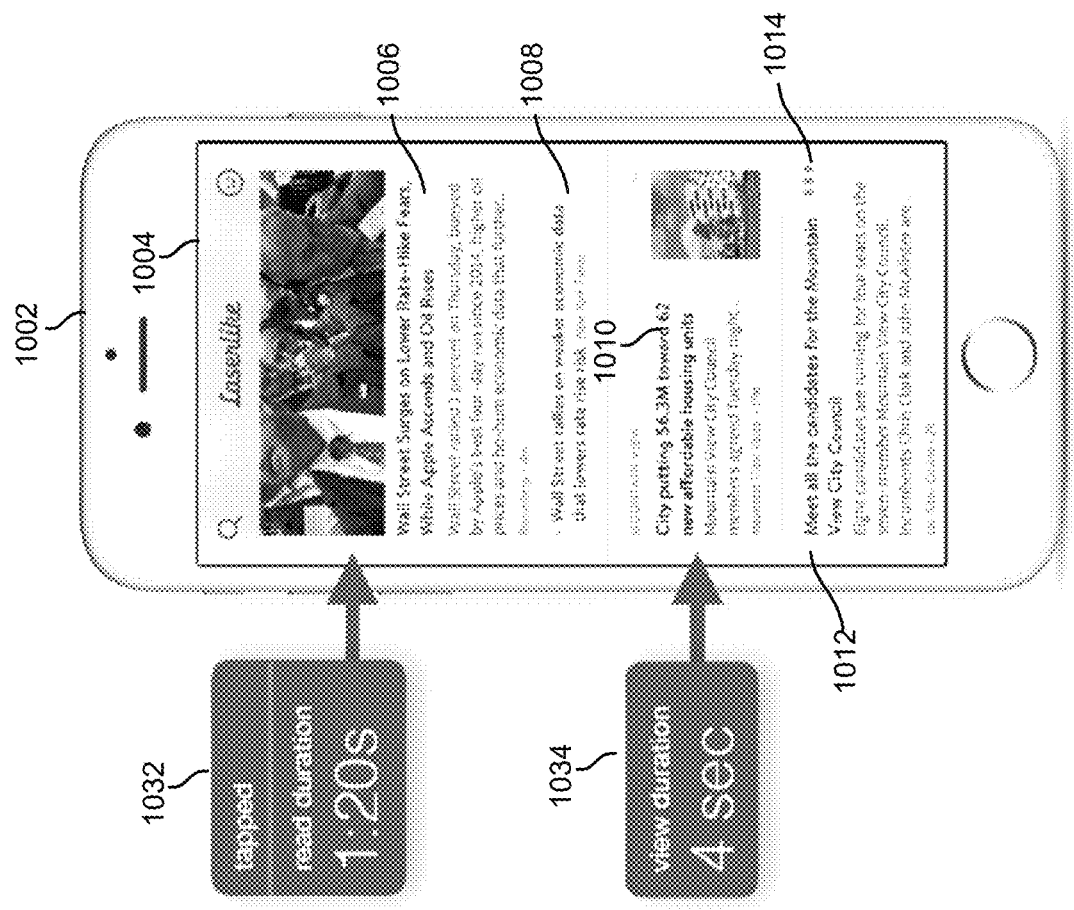
FIG. 10A a block diagram illustrating a user interface of a client application of a system for providing a content feed in accordance with some embodiments.

FIG. 10A a block diagram illustrating a user interface of a client application of a system for providing a content feed in accordance with some embodiments. In the example shown, the system can be implemented on device 1002. In some embodiments, device 1002 can be either device 132, device 134, device 136, or device 138. In the example shown, an application 1004, such as application 224, is running on device 1002, and configured to provide a content feed to a user. The content feed is comprised of one or more cards that includes web documents (e.g., or excerpts of web documents that can be selected to view the entire web document) and/or synthesized content and is based on a user model, such as user model 314, which is tailored to a user account, such as user account 602. For example, a web document can be an article, sponsored content, an advertisement, a social media post, online video content (e.g., embedded video file), online audio content (e.g., embedded audio file), etc.

In the example shown, content feed 1004 includes web documents 1006, 1008, 1010, and 1012. Each web document is associated with a determined interest associated with a user. Each determined interest has a corresponding endorsement score. In some embodiments, a web document is provided in content feed 1004 in the event the corresponding endorsement score is above a certain threshold. In some embodiments, the certain threshold can be a threshold endorsement score, a top percentage of interests (e.g., top 10%), a top tier of interests (e.g., top 20 interests), etc.

In some embodiments, content feed 1004 can include a plurality of documents for a particular interest. Content feed 1004 can include multiple versions of a topic associated with an interest. For example, web document 806 is from a first source and web document 1008 is from a second source, but both web documents are about the same topic.

Content feed 1004 can also include multiple web documents that correspond to a particular interest. For example, web document 1010 and web document 1012 both correspond to an interest of "Mountain View," but are about different topics associated with the interest of "Mountain View."

Application 1004 is configured to provide user feedback to a user interest model based on user engagement with content feed 1004. User engagement can be implicit, explicit, or a combination of implicit and explicit user engagement, such as further described below.

In some embodiments, implicit user engagement can be based on a duration that a web document appears in the content feed. In the example shown, web document 1006 has an associated user engagement 1032 that indicates after the user selected (e.g., clicked or "tapped") the article, the user read the web document for a duration of 1.2 seconds and web document 1010 has an associated user engagement 1034 that indicates the user viewed the web document in the content feed for a duration of four seconds.

A user's source preference can also be implicitly determined from the user engagement. In the example shown, web document 1006 and web document 1008 are different versions of a topic associated with an interest. Each web document has a corresponding source. Even though both web documents provide information about the same topic, based on whether a user selects web document 1006 or web document 1008, a user source preference can be determined. For example, web documents 1006, 1008 are about a topic in Wall Street. Web document 1006 may be from Bloomberg® and web document 1008 may be from the Wall Street Journal®. Depending upon which web document selected by the user, a source preference can be determined. This user feedback can be provided to user interest model.

A web document depicted content feed 1004 includes an option menu link 1014 that when selected, allows a user to provide explicit feedback about a web document.

FIG. 10B another block diagram illustrating a user interface of a client application of a system for providing a content feed in accordance with some embodiments. In the example shown, the system can be implemented on device 1002. In some embodiments, device 1002 can be either device 132, device 134, device 136, or device 138. In the example shown, an application 1004 such as application 224, is running on device 1002, and configured to provide a content feed to a user.

In the example shown, a user has selected option menu link 1014. In response to the selection, the application generating content feed 1004 is configured to render option menu 1018. Option menu 1018 provides a user with one or more options to provide explicit feedback about a particular web document. In the example shown, a user can share 1020 the web document to social media account associated with the user, a social media account associated with another user, to an email account associated with the user, or an email account associated with another user. A user can also provide reaction feedback 1022, 1024, 1026, such as "great" (e.g., "see more like this"), "meh" (e.g., "see less like this"), and "nope" (e.g., "I'm not interested") respectively, about the content of the web document. A user can also provide feedback 1028, 1030 about the web document in general, such as to provide user feedback to the app/system that the web document is off-topic from an interest or the web document includes bad content (e.g., a broken link or other bad content issues associated with the web document).

As will be further described below, the user feedback can be provided to a user interest model, which in response, can be used to adjust an endorsement score associated with a ranked interest.

Figure 11:
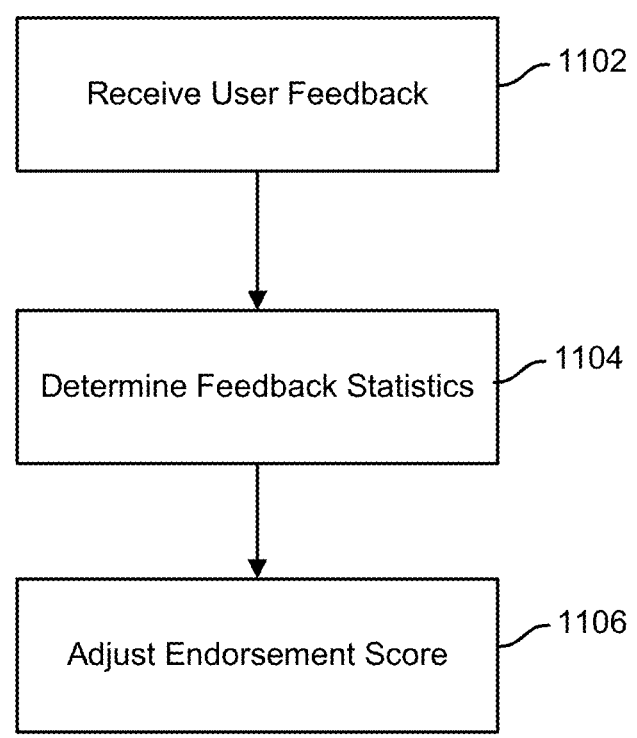
FIG. 11 is a flow diagram illustrating a process for adjusting a user model based on user feedback in accordance with some embodiments.

FIG. 11 is a flow diagram illustrating a process for adjusting a user model based on user feedback in accordance with some embodiments. Process 1100 may be implemented in a user model, such as user model 314.

At 1102, user feedback is received from an application providing a content feed. The user feedback can be implicit, explicit, or a combination of implicit and explicit feedback.

At 1104, one or more feedback statistics are determined based on the user feedback. For a given interest, the user model can determine the number of web documents provided in the content feed for a particular interest, the number of times a user selected a web document provided in the content feed for a particular interest, a number of times a web document was uniquely provided in the content feed, and a number of times a user uniquely selected a web document. In an example implementation, a content feed includes a sequence of cards that include web documents (e.g., or excerpts of web documents that can be selected to view the entire web document) and/or synthesized content. A user can scroll through the sequence of cards from beginning to end. A user can scroll down through the sequence of cards or scroll up through the sequence of cards.

A web document is uniquely provided in the content feed in the event a web document is shown in the content feed only once. A web document is not uniquely provided in the content feed in the event a web document is shown in the content feed more than once. For example, a web document may be provided in the content feed and the user may scroll past the web document to view other web documents, thus causing the web document to no longer be visible in the content feed. The user may scroll back to the beginning of the content feed and see the web document a second time.

A user uniquely selects a web document in the event the user selects to view the web document provided in the content feed only once. A user does not uniquely select a web document in the event the user does not select to view the web document provided in the content feed or selects to view the web document provided in the content feed more than once.

In some embodiments, a tap rate associated with an interest can be determined. A tap rate is computed by the number of times a user selected a web document associated with the particular interest divided by the number of times a web document associated with the particular interest was provided in the content feed.

In other embodiments, a unique tap rate associated with an interest can be determined. A unique tap rate is computed by the number of times a web document was uniquely selected for a particular interest divided by the number of times a web document for the particular interest was uniquely provided in the content feed.

In other embodiments, a median viewing duration, a maximum viewing duration, a minimum viewing duration, and an average viewing duration can be determined for web documents appearing in the content feed for a particular interest. In other embodiments, a median reading duration, a maximum reading duration, a minimum reading duration, and an average reading duration can be determined for web documents associated with a web document that appeared in the content feed and was selected by the user.

At 1106, an endorsement score associated with one or more interests is adjusted by a particular amount based on the one or more feedback statistics. The feedback statistics can be used to determine a probability that a user is interested in an interest. The probability that a user is interested in a particular interest can be used to increase or decrease an endorsement score associated with the particular interest by a particular amount.

Figure 12:
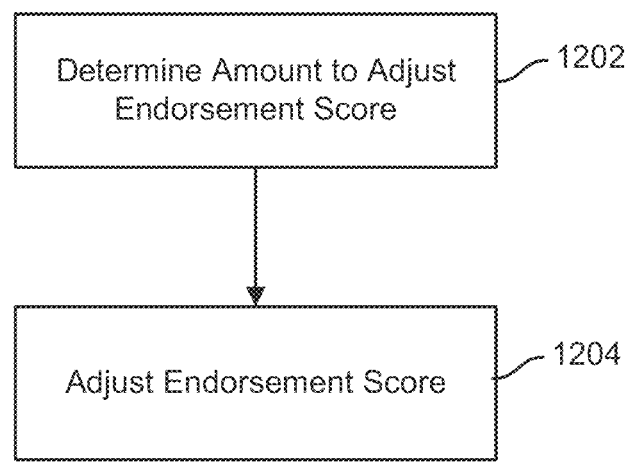
FIG. 12 is a flow diagram illustrating a process for adjusting the user model in accordance with some embodiments.

FIG. 12 is a flow diagram illustrating a process for adjusting the user model in accordance with some embodiments. Process 1200 may be implemented on a computing device, such as search and feed service 102.

At 1202, an amount to adjust an endorsement score is determined. In some embodiments, the endorsement score of an interest is adjusted to promote lower ranked interests that are similar to the top ranked interests. In some embodiments, the endorsement score of an interest is adjusted to promote lower ranked interests that are similar to the top tier of ranked interests.

In some embodiments, the endorsement scores of one or more interests can be adjusted by a particular amount based on by comparing a web document associated with a first interest with a web document associated with a second interest and determining the similarities between the web documents. In some embodiments, the endorsement scores of one or more interests can be adjusted by a particular amount based on comparing a set of web documents associated with a first interest and a set of web documents associated with a second interest and determining similarities between the sets of web documents. In some embodiments, an endorsement score of an interest can also be adjusted by a particular amount based on user engagement with an interest on a website. For example, an interest may appear as a subreddit on the website Reddit® and have a particular number of subscribers to the subreddit. In some embodiments, the endorsement scores of one or more interests can be adjusted by a particular amount based on whether a topic associated with an interest is trending or whether a topic associated with an interest related to an interest of the user is trending. In another embodiment, the endorsement scores of one or more interests can be adjusted based on a curation score associated with the interest. In another embodiment, the endorsement scores or one or more interests can be adjusted based on good interest probability value. In another embodiment, the curation score associated with the interest and the good interest probability value are adjusted based on each other and the adjusted score and adjusted value are used to adjust the endorsement score. In some embodiments, one or more interests can be re-ranked based on whether one or more meta keywords associated with a web document correspond to an interest.

At 1204, the endorsement score of an interest is adjusted based on the determined amount. In some embodiments, the endorsement score of an interest is adjusted based on whether a web document associated with the interest shares a threshold number of common links with a web document associated with a second interest. In other embodiments, the endorsement score of an interest is adjusted based on whether the distance between a vector of the interest and a vector of another interest (e.g., in a 100 dimensional space) is less than or equal to the similarity threshold using the disclosed embedding related collaborative filtering techniques. In other embodiments, the endorsement score of an interest is adjusted based on user engagement with an interest on a website. In other embodiments, the confidence score of an interest is adjusted based on whether a topic associated with the interest is trending. In other embodiments, the endorsement score an interest is adjusted based on whether meta keywords associated with a web document viewed by a user is similar to the interest.

Figure 13:
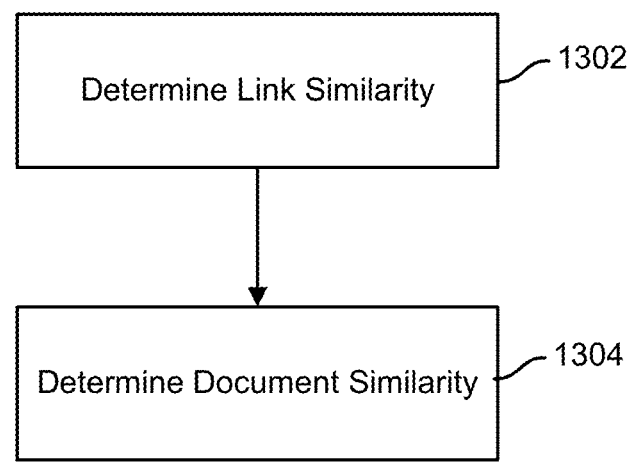
FIG. 13 is a flow diagram illustrating a process for determining a similarity between interests in accordance with some embodiments.

FIG. 13 is a flow diagram illustrating a process for determining a similarity between interests in accordance with some embodiments. Process 1300 may be implemented on a computing device, such as search and feed service 102. In some embodiments, process 1300 can be used to perform part or all of step 1202.

At 1302, a link similarity between two interests is determined. In some embodiments, a web document can include inlinks and outlinks. An inlink is an embedded link within a different web document that references the web document. An outlink is an embedded link within the web document that references a different web document. For example, a Wikipedia® page associated with an interest includes a number of inlinks and a number of outlinks. Within a particular Wikipedia® page, there may be one or more outlinks that reference another Wikipedia® page. There may also be one or more other Wikipedia® pages that reference the particular Wikipedia® page.

The one or more links of a web document associated with a first interest and the one or more links of a web document associated with a second interest are compared to determine link similarity between the interests. In the event a web document associated with a first interest shares a threshold number of common links with a web document associated with a second interest, the interests are determined to be similar. For example, a web document associated with a first interest can share a threshold number of common inlinks with a web document associated with a second interest. A web document associated with a first interest can share a threshold number of common outlinks with a web document associated with a second interest. A web document associated with a first interest can share a threshold number of common inlinks and a threshold number of common outlinks with a web document associated with a second interest.

In some embodiments, an endorsement score associated with lower ranked interest can be increased by a particular amount in the event a web document associated with the lower ranked interest shares a threshold number of common links with a web document associated with a higher ranked interest. In some embodiments, an endorsement score associated with lower ranked interest can be decreased by a particular amount in the event a web document associated with the lower ranked interest does not shares a threshold number of common links with a web document associated with a higher ranked interest. In some embodiments, an endorsement score associated with lower ranked interest is unchanged in the event a web document associated with the lower ranked interest does not share a threshold number of common links with a web document associated with a higher ranked interest.

At 1304, a document similarity between two interests is determined. The vast corpus of web documents on the World Wide Web is growing each day. Each of the web documents includes text-based information that describes the subject matter of a web document. A web document can reference one or more entities that correspond to one or more interests. If two interests are similar, then the number of web documents that refer to both interests is higher than if the two interests are dissimilar. For example, the number of web documents that refer to both "cat" and "dog" is higher than the number of web documents that refer to both "dog" and "surfing."

In some embodiments, to determine the common web documents between two interests, collaborative filtering techniques are applied. In some embodiments, an embedding related collaborative filtering technique is implemented as a matrix decomposition problem. In an example implementation, the collaborative filtering scheme represents all entities and all documents as a matrix. Given the vast number of web documents and the vast number of potential interests, an m×n matrix X (e.g., a co-occurrence matrix of dimensions m by n) can represent all the web documents and whether a particular web document is about a particular entity that corresponds to a particular interest. In some embodiments, each cell of the matrix includes a value that represents a ratio between the frequency of the entity in all web documents to the frequency of the entity in the particular web document. In other embodiments, each cell of the matrix includes a value that represents a confidence level for an entity in a particular web document. To reduce the amount of computation power needed to determine whether two interests share common web documents, the m×n matrix X can be represented as an m×k matrix U multiplied by a k×n matrix W, where k is a number. In some embodiments, k is a relatively small integer, such as 100. When k=100, each entity can be represented as a 100 dimensional space vector of web documents and each web document can be represented as a 100 dimensional space vector of entities (e.g., each entity can be embedded in the 100 dimensional space).

Depending upon the 100 dimensional space vectors selected, UW≠X, but instead UW=X'. In this example, U and W are computed such that the computed product of U multiplied by W equals X'. U and W are initially chosen at random (e.g., randomly selecting values from the original X matrix to populate the respective U and W matrices), and U and W are incrementally adjusted through several iterations (e.g., 1000, 5000, or some other number of iterations can be performed depending on, for example, the applied cost function and computing power applied to the operations) to minimize a differentiable cost function, such as the squared error of the values of X' compared to X. The solution of this operation can be described as a simultaneous calculation of a linear regression of the row matrix U given a known value of W and X and a linear regression of the column matrix W given a known value of U and X, which is often referred to as Alternate Least Squares (ALS). When the squared error between the X' and X are minimized, the entities represented in the co-occurrence matrix X are embedded in a 100 dimensional space and their location within that space is represented by a 100 dimensional space vector. As a result, a distance between two 100 dimensional space vectors can be determined to facilitate various embedded based comparison, similarity, and retrieval techniques described herein. In some embodiments, a Euclidean distance between the 100 dimensional space vectors is determined. For example, in the event the distance between two 100 dimensional space vectors is less than or equal to a document similarity threshold, the two interests are determined to be similar. In the event the distance between two 100 dimensional space vectors is greater than a document similarity threshold, the two interests are determined to be dissimilar. In some embodiments, an endorsement score associated with a lower ranked interest can be increased by a particular amount in the event the distance between the 100 dimensional space vector of the lower ranked interest and the 100 dimensional space vector of the higher ranked interest is less than or equal to the document similarity threshold. In some embodiments, an endorsement score associated with lower ranked interest can be decreased by a particular amount in the event the distance between the 100 dimensional space vector of the lower ranked interest and the 100 dimensional space vector of the higher ranked interest is greater than the document similarity threshold. In some embodiments, an endorsement score associated with lower ranked interest is unchanged in the event the distance between the 100 dimensional space vector of the lower ranked interest and the 100 dimensional space vector of the higher ranked interest is greater than the document similarity threshold. The particular amount can depend on the difference between the distance and the document similarly threshold.

In other embodiments, a dot product between the 100 dimensional space vectors can be used to determine if two interests are similar to each other. In the event the dot product between the two 100 dimensional space vectors is greater than or equal to a document similarity threshold, then the two interests are determined to be similar. In the event the dot product between two 100 dimensional space vectors is less than a document similarity threshold, then the two interests are determined to be dissimilar.

In some embodiments, an endorsement score associated with lower ranked interest can be increased by a particular amount in the event the dot product between the 100 dimensional space vector of the lower ranked interest and 100 dimensional space vector of the higher ranked interest is greater than or equal to the document similarity threshold. In some embodiments, an endorsement score associated with lower ranked interest can be decreased by a particular amount in the event the dot product between the 100 dimensional space vector of the lower ranked interest and 100 dimensional space vector of the higher ranked interest is less than the document similarity threshold. In some embodiments, an endorsement score associated with lower ranked interest is unchanged in the event the dot product between the 100 dimensional space vector of the lower ranked interest and 100 dimensional space vector of the higher ranked interest is less than the document similarity threshold. The particular amount can depend on the difference between the dot product and the document similarly threshold.

Figure 14:
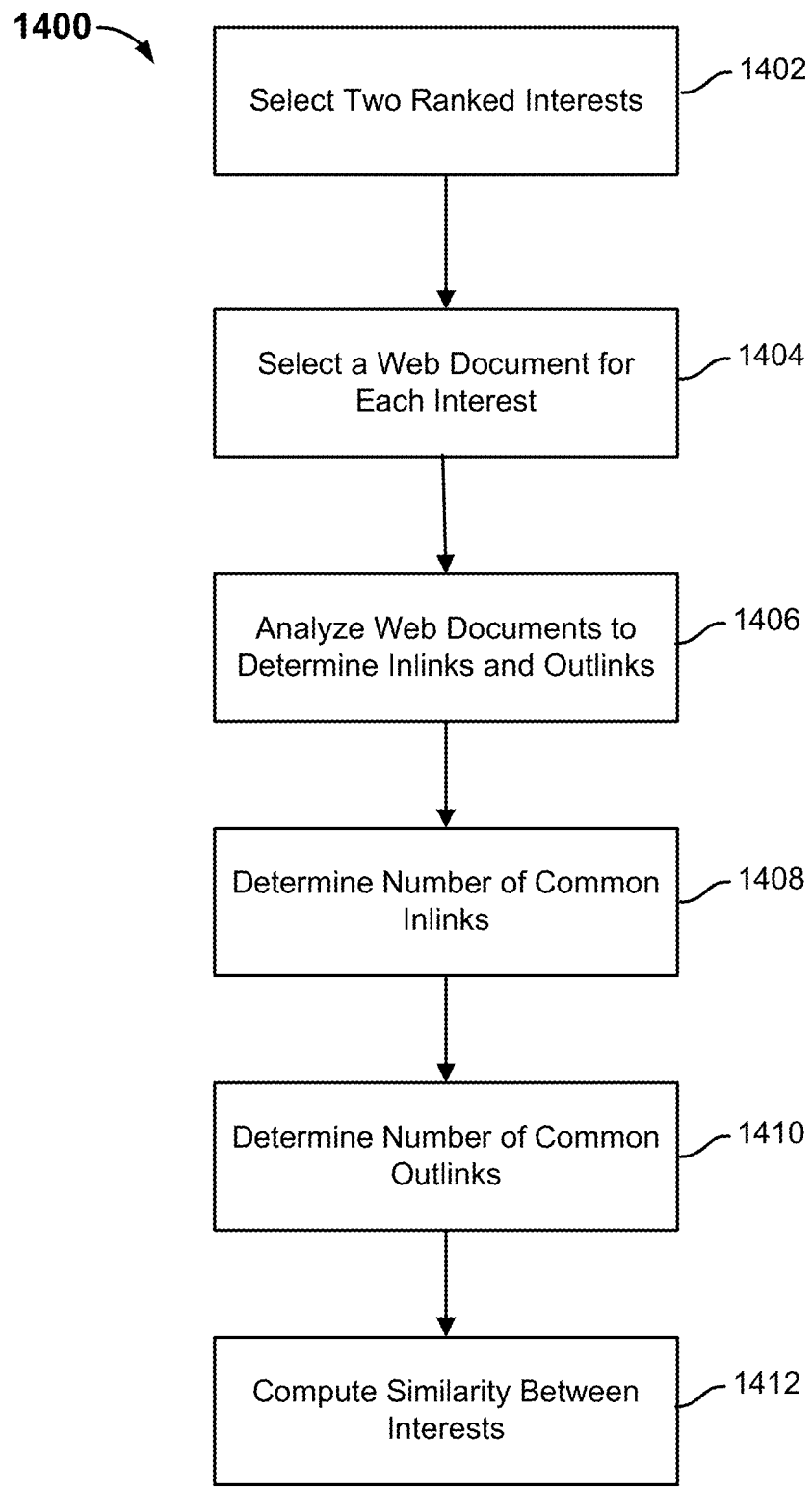
FIG. 14 is a flow diagram illustrating a process for determining a link similarity between interests in accordance with some embodiments.

FIG. 14 is a flow diagram illustrating a process for determining a link similarity between interests in accordance with some embodiments. The process 1400 may be implemented on a computing device, such as search and feed service 102. In some embodiments, the process 1400 can be used to perform part or all of step 1302.

At 1402, two ranked interests for a particular user account are selected. In some embodiments, a first interest is the top ranked interest. In other embodiments, a first interest is an interest from the top tier of ranked interests for the particular user account. In some embodiments, a second interest is any interest that is lower ranked than the top ranked interest. In other embodiments, the second interest is any interest that is outside the top tier of ranked interests. In other embodiments, the second interest is another interest from the top tier of ranked interests.

At 1404, a web document associated with the first interest and a web document associated with the second interest are selected.

At 1406, the web document associated with the first interest and the web document associated with the second interest are analyzed to determine inlinks and outlinks associated with each web document.

At 1408, the number of inlinks that is common to the web document associated with the first interest and the web document associated with the second interest is determined.

At 1410, the number of outlinks that is common to the web document associated with the first interest and the web document associated with the second interest is determined.

At 1412, a similarity value between the two interests is computed based on the number of common outlinks and the number of common inlinks. In some embodiments, in the event a web document associated with a first interest shares a threshold number of common links with a web document associated with a second interest, the interests are determined to be similar. In some embodiments, the number of common outlinks and the number of common inlinks are added together to determine the similarity value. In some embodiments, number of common outlinks and the number of common inlinks are represented as a ratio. In some embodiments, the number of common outlinks and the number of common inlinks are multiplied together to determine the similarity value.

Figure 15:
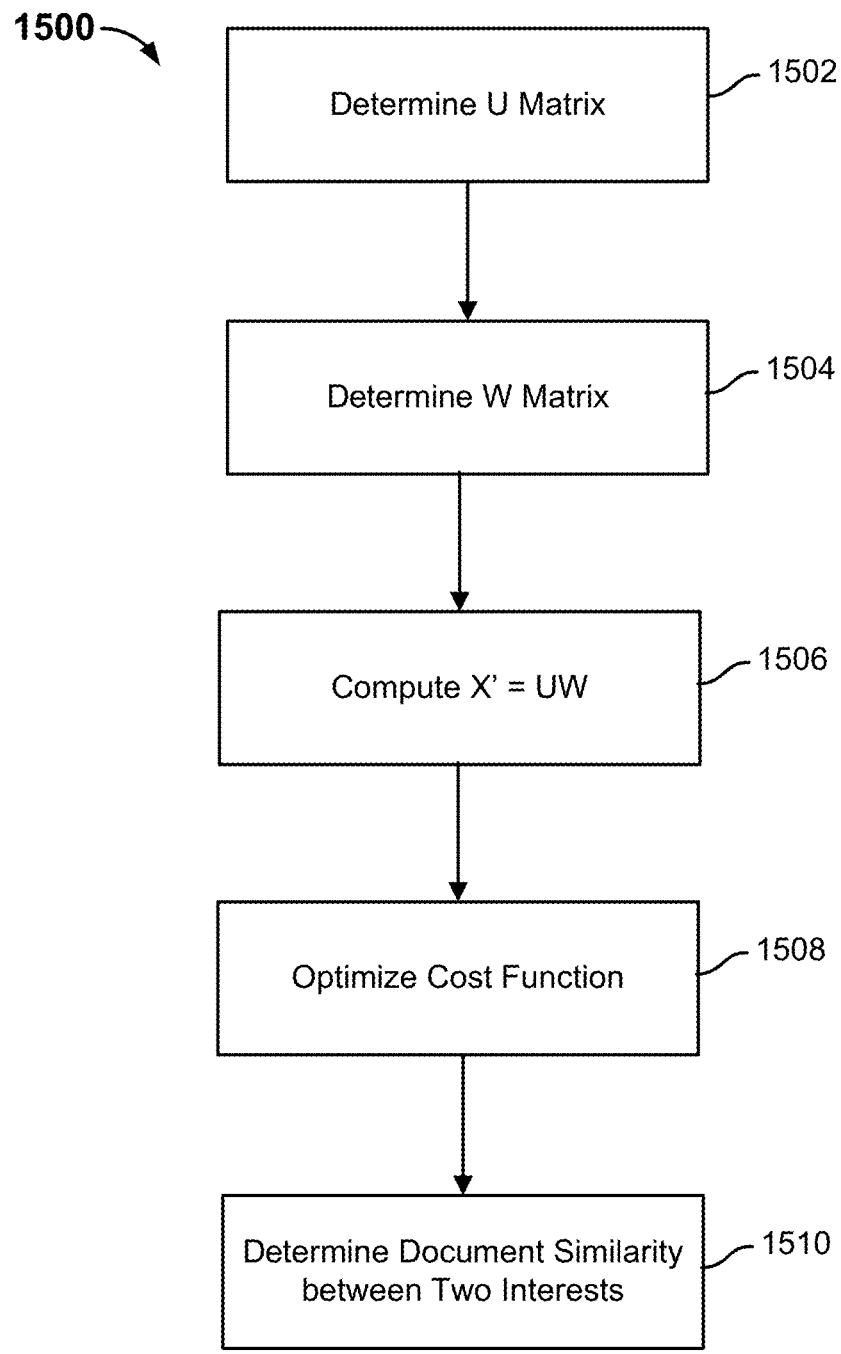
FIG. 15 is a flow diagram illustrating a process for determining a document similarity between two interests in accordance with some embodiments.

FIG. 15 is a flow diagram illustrating a process for determining a document similarity between two interests in accordance with some embodiments. The process 1500 may be implemented on a computing device, such as search and feed service 102. In some embodiments, the process 1500 can be used to perform part or all of step 1304.

The entire set of web documents and the interests associated with each individual document can be represented as a matrix X.

| X = | | | | | |
|---|---|---|---|---|---|
| X | $D_0$ | $D_1$ | $D_2$ | ... | $D_n$ |
| $E_0$ | $A_{00}$ | $A_{01}$ | $A_{02}$ | ... | $A_{0n}$ |
| $E_1$ | $A_{10}$ | $A_{11}$ | $A_{12}$ | ... | $A_{1n}$ |
| $E_2$ | $A_{20}$ | $A_{21}$ | $A_{22}$ | ... | $A_{2n}$ |
| ... | ... | ... | ... | ... | ... |
| $E_m$ | $A_{m0}$ | $A_{m1}$ | $A_{m2}$ | ... | $A_{mn}$ |

The value of each cell of in the matrix X is a value $A_{xy}$ that indicates the importance of an entity with respect to a document. An entity can correspond to an interest. In some embodiments, the value $A_{xy}$ is a ratio between a measure of frequency of the entity in a particular document over the frequency of the entity in all documents. In other embodiments, the value $A_{xy}$ is a value that represents a confidence level for an entity in a particular web document. Some cells in the matrix X will have a value of 0 because the document is not about or does not reference the particular entity. Given the number of possible entities and possible web documents, the matrix X is a very large matrix.

The matrix X can be used to determine a list of documents associated with a particular entity. For example, an entity $E_2$ can be represented as $E_2=\{A_{20}, A_{21}, A_{22}, A_{2n}\}$, where $A_{xy}$ represents the importance of a corresponding document entity for a particular document. Similar documents will have similar scores for a particular entity.

The matrix X can also be used to determine a list of entities associated with a particular document. For example, a document $D_2$ can be represented as $D_2=\{A_{02}, A_{12}, A_{22}, A_{m2}\}$, where $A_{xy}$ represents the importance of a corresponding entity for a particular document. Similar entities will have similar scores in a particular document.

Determining the similarity between two entities using matrix X can be computationally intensive and time consuming. To reduce the amount of resources and time needed to determine the similarity between two entities in the matrix X, a collaborative filtering technique is implemented. Collaborative filtering can be implemented as a matrix decomposition problem. Given X is a m×n matrix, X can be approximated as a matrix $U_{m \times k}$ multiplied by a matrix $w_{k \times n}$, such that X=UW. When X' is approximately equal to X and k is a relatively small integer (e.g., 100), the matrices U and W provide k-dimensional vectors for the rows and columns of X that can be used to calculate the similarity between values.

At 1502, a matrix $U_{m \times k}$ is determined. U is a matrix of m entities by k documents.

At 1504, a matrix $W_{k \times n}$ is determined. W is a matrix of k entities by n documents. In an example implementation, U and W are initially chosen at random (e.g., randomly selecting values from the original X matrix to populate the respective U and W matrices).

At 1506, X'=UW is computed.

At 1508, a cost function between X and X' is computed. In some embodiments, a cost function of $\|X'-X\|^2$ is determined. In other embodiments, other cost functions (e.g., differentiable cost functions) can be utilized. U and W are incrementally adjusted and the cost function is determined again. In some embodiments, U and W can be computed using an Alternate Lease Squares technique. In some embodiments, a Gradient Descent technique can be employed to determine U and W where cost and gradients are computed simultaneously based on previous values of U and W. The matrices U and W are incrementally adjusted several times (e.g., 1000, 5000, 10000, or some other number of iterations can be performed depending on, for example, the applied cost function and computing power applied to the operations) in order to minimize the cost function. When the cost function is minimized, the process proceeds to step 1310.

In some embodiments, a negative sampling technique is implemented for calculating U and W. In other embodiments, a distributed algorithm is implemented for calculating U and W. For example, the matrix X is divided into windows on a grid R by C, where the grid divides the rows and columns of X into r and c segments. The window w=r*C+c (where 0≤r<R and 0≤c<C) contains all the values of X that have a row index between r*m/R and (r+1)*m/R and a column index of c*n/C and (c+1)*n/C. A plurality of distributed workers are implemented to compute the distributed algorithm. Each distributed worker loads a window of the matrix X into memory. A separate master process is responsible for the parameter updates of values of U and W for each iteration.

In order to compute the cost function and the gradients corresponding to a window, each worker requires the values of U and W corresponding to its row and column on the grid R, C.

In order to limit the network bandwidth required for communication in the master, an information distribution tree is created. For each slice of U by R and each slice of W by C, the master is responsible to send parameter updates to a single worker. This worker is then responsible to update N other workers (e.g., where N is typically 2 or 4) on the same grid row r or column c. This process is applied recursively until all workers have the parameters required for the cost and gradient computation. Gradient and cost updates to the master follow the inverse path on the tree. Gradients are summed as they propagate up the distribution tree since the gradient for a given parameter $U_i$ is the sum of all the gradients for all valid points of X(i,j). This process allows the distributed algorithm to consider all the data points of X for each iteration, even for large matrices given that the memory and computations of the values of X can be distributed over a large number of compute workers.

The above-described example distributed algorithm implementation maintains only one copy of X in memory thereby reducing memory requirement for performing these operations. Further, this example distributed algorithm implementation also uses an approach to distribute the network load across the workers in order to avoid having the master be the bottleneck in parameter and gradient updates.

At 1510, a document similarity between two entities is determined. Each row of the matrix $U_{m \times k}$ is a 100 dimensional space representations of an entity. For example, $E_0$ can be Represented as a 100 element vector with each element value corresponding to the value representative of an entity in a particular document. In some embodiments, a document similarity between two entities can be determined by computing a difference between two vectors. In some embodiments, a document similarity between two entities can be determined by computing a dot product between two vectors.

Figure 16:
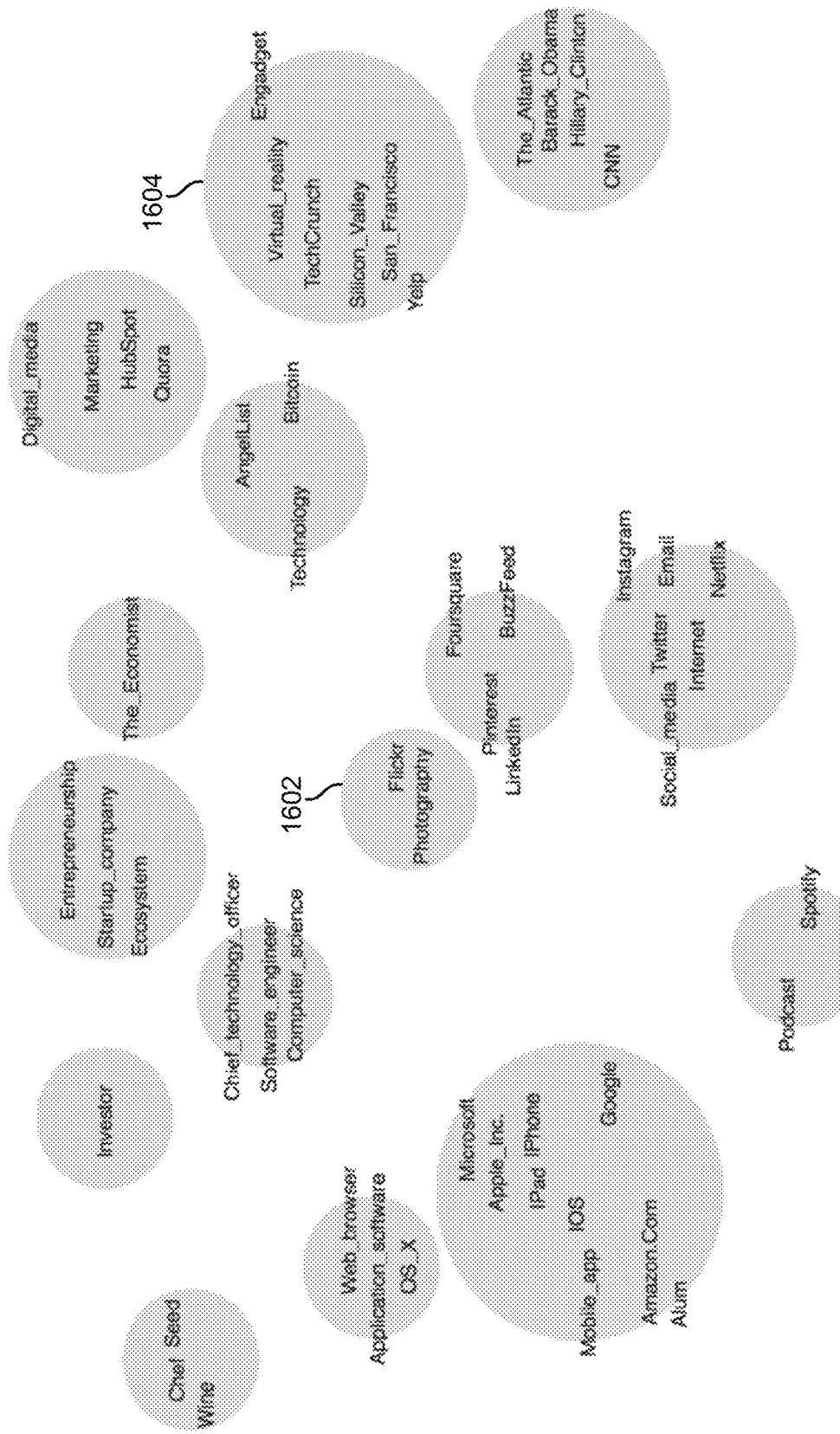
FIG. 16 is an example of a 2D projection of a 100 dimensional space vectors for a particular user account in accordance with some embodiments.

FIG. 16 is an example of a 2D projection of a 100 dimensional space vectors for a particular user account in accordance with some embodiments. In the example shown, user account "user1" has a plurality of interests. As seen in FIG. 16, some of the interests in the 100 dimensional vector space are clustered together after performing the collaborative filtering technique described above with respect to step 1304 and FIG. 15. For example a cluster 1602 includes an interest in photography and an interest in Flickr®. Cluster 1604 includes an interest in Yelp®, San Francisco, Silicon Valley, TechCrunch®, virtual reality, and Engadget®. The interests comprise a cluster in the event the distance between each 100 dimensional space vector of a plurality of interests is less than or equal to a document similarity threshold. In the example shown, the distance between the 100 dimensional space vectors of Yelp®, San Francisco, Silicon Valley, TechCrunch®, virtual reality, and Engadget® are all less than or equal to a document similarity threshold. In contrast, the distance between the 100 dimensional space vector of Flickr® and San Francisco is greater than a document similarity threshold.

Figure 17:
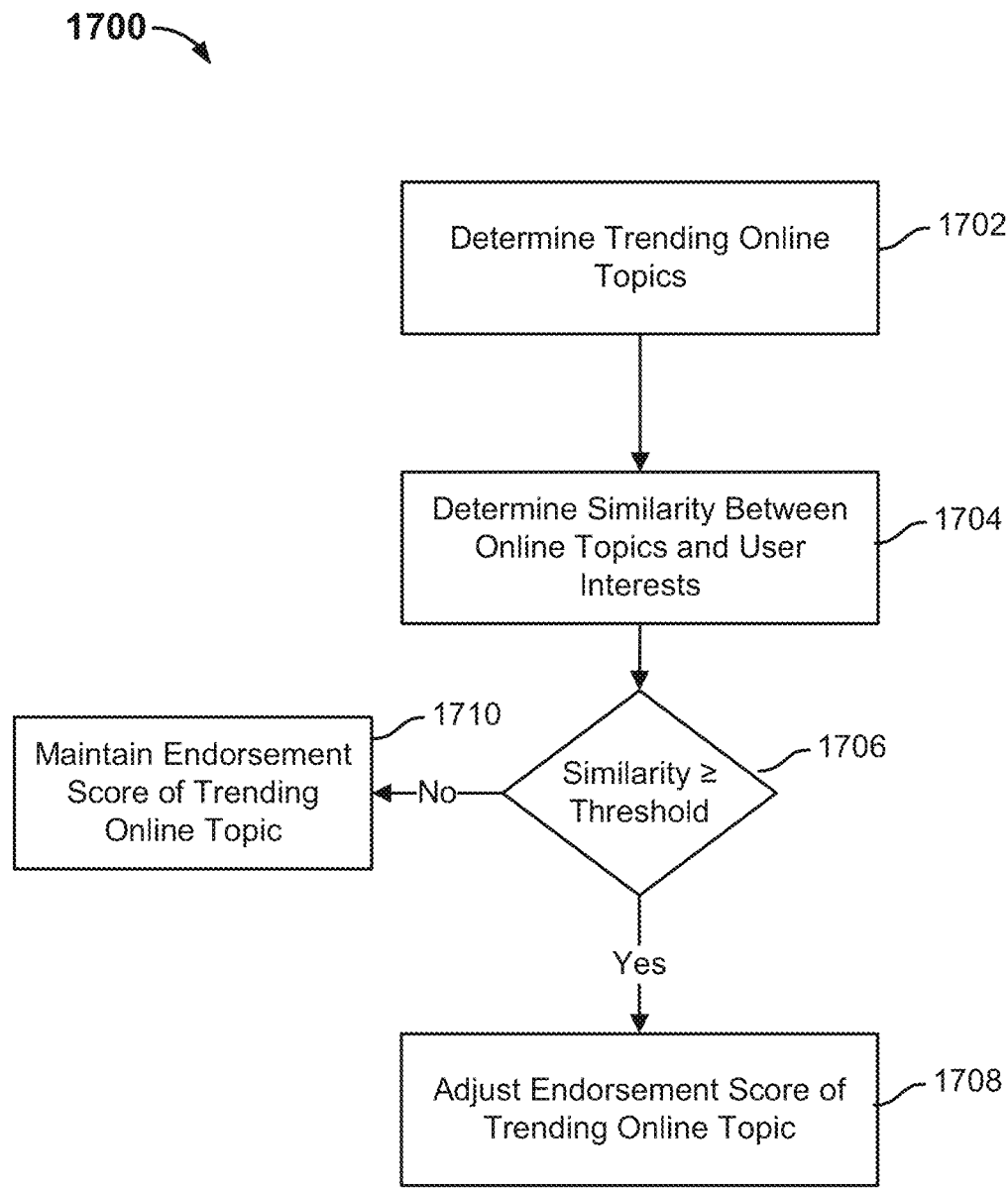
FIG. 17 is a flow diagram illustrating a process for determining a similarity between a trending topic and a user interest in accordance with some embodiments.

FIG. 17 is a flow diagram illustrating a process for determining a similarity between a trending topic and a user interest in accordance with some embodiments. The process 1700 may be implemented on a computing device, such as search and feed service 102. In some embodiments, the process 1700 can be used to perform part or all of process 1200.

At 1702, one or more trending topics is determined. A trending topic is a topic that is associated with more frequent online content in a recent duration. For example, there may be no instances of online content for a topic for a period of six months and then the topic receives an increased number (e.g., hundreds, thousands, millions, etc.) of instances of online content in a most recent duration (e.g., minutes, hours, days, weeks, etc.). A topic can become a trending topic in the event a threshold number of users on a social media platform perform a combination of actions (e.g., tweet, post, share, etc.) associated with the topic within a specified duration.

In some embodiments, a topic is determined to be trending based on a relative or proportional increase above a proportional trending threshold value in the number of online content associated with the topic. For example, a topic that receives consistent online content each day, but receives a slight increase in the number of online content associated it on a particular day may not be considered to be trending. However, a topic that receives almost no online content each day, but receives a slight increase in the number of online content associated with it on a particular day may be considered to be trending because the proportional increase in the number of online content is higher for that particular topic. For example, a topic that receives 100 mentions in online content each day and then receives 105 mentions on a particular day would not be considered to be trending, even though the topic received 5 more mentions on that particular day. In contrast, a topic that receives 1 mention in online content each day and then receives 6 mentions on a particular day would be considered to be trending because the proportional increase in the number of online content is significant.

At 1704, a similarity between a trending topic and one or more of the user interests is determined. In some embodiments, the similarity between a trending topic and one or more of the user interests is determined based on a link similarity between a web document associated with the trending topic and a web document associated with a corresponding user interest. In other embodiments, the similarity between the trending topic and one or more of the user interests is determined based on a document similarity between the web documents associated with the trending topic and the web documents associated with a user interest.

At 1706, it is determined whether the similarity between the trending topic and a user interest is greater than or equal to a trending topic threshold. In the event the similarity is greater than or equal to the trending topic threshold, then the process proceeds to 1708 and the endorsement score of one or more interests that correspond to the trending topic can be adjusted. In response, one or more web documents associated with the one or more interests that correspond to the trending topic can be provided to a user in a content feed via an application. In the event the similarity is less than the trending topic threshold, then the process proceeds to 1710 and the endorsement score of one or more interests that correspond to the trending topic is maintained.

Figure 18:
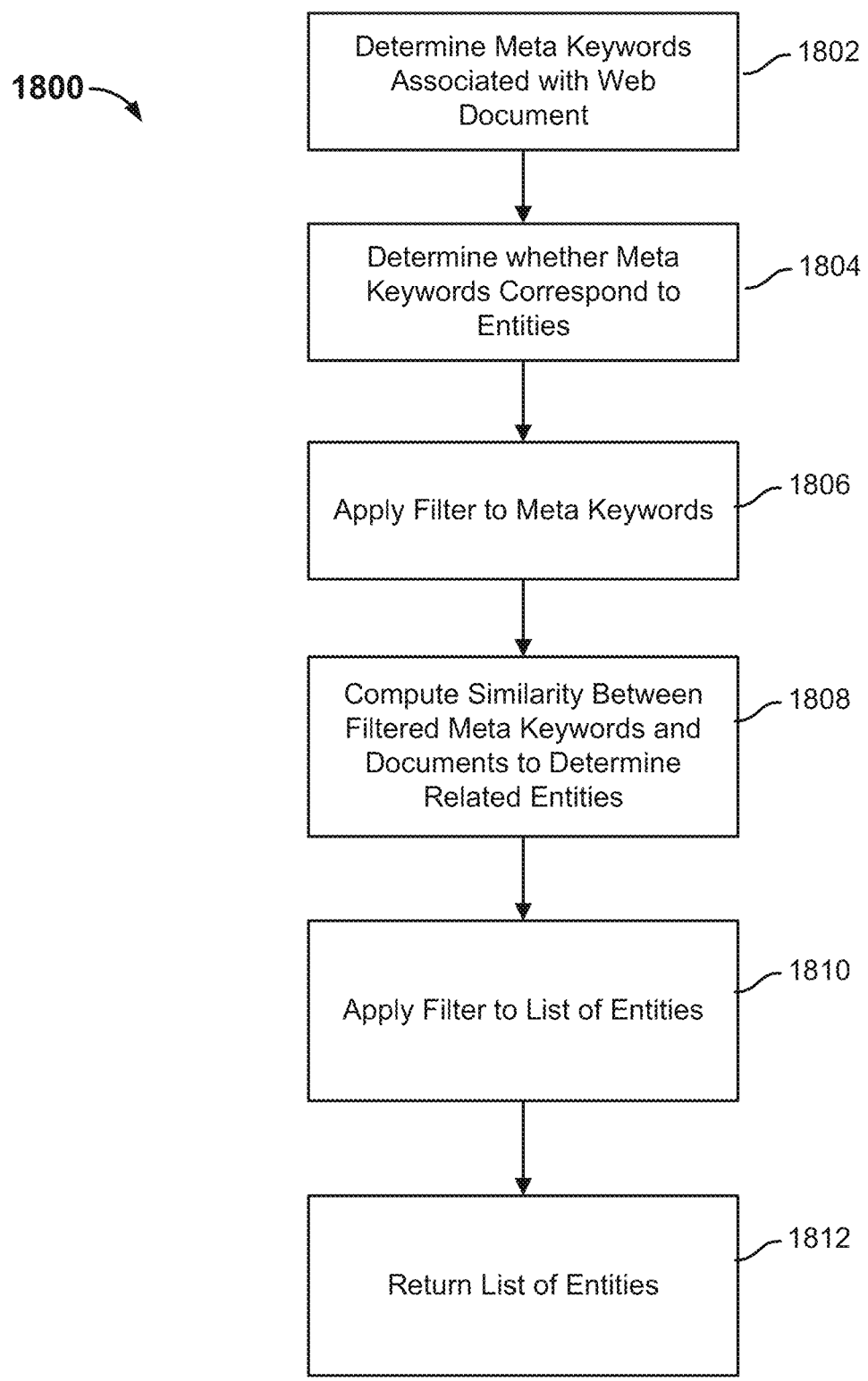
FIG. 18 is a flow diagram illustrating a process for suggesting web documents for a user account in accordance with some embodiments.

FIG. 18 is a flow diagram illustrating a process for suggesting web documents for a user account in accordance with some embodiments. The process 1800 may be implemented on a computing device, such as search and feed service 102. In some embodiments, the process 1800 can be used to perform part or all of step 1304.

At 1802, one or more meta keywords associated with a web document are determined. In some embodiments the web document is a web document viewed or read by a user in a content feed.

At 1804, it is determined whether the one or more meta keywords associated with a document correspond to an interest.

At 1806, a first filter is applied to the one or more meta keywords associated with a document that correspond to an interest. In some embodiments, the filter removes meta keywords that do not correspond to a top tier of ranked interests (e.g., interests with a particular confidence score) for the user account.

At 1808, a similarity between the filtered meta keywords that correspond to a top tier of ranked interests and other interests is determined. In some embodiments, a collaborative filtering technique is applied to determine the similarity between the filtered meta keywords that correspond to a top tier of ranked interests and other interests. In the event the 100 dimensional space vector of a filtered meta keyword that corresponds to a top tier ranked interest and a second interest is less than or equal to a threshold distance, then the second interest is added to a list of recommended interests.

At 1810, a second filter is applied to the list of recommended interests. In some embodiments, the second filter removes interests with inappropriate content or are too general.

At 1812, a list of recommended interests is returned and used to provide web documents to a user in a content feed via an application. In some embodiments, web documents associated with the recommended interests are provided in the content feed. In other embodiments, confidence scores associated with the recommended interests are adjusted such that associated web documents are provided in the content feed.

Figure 19:
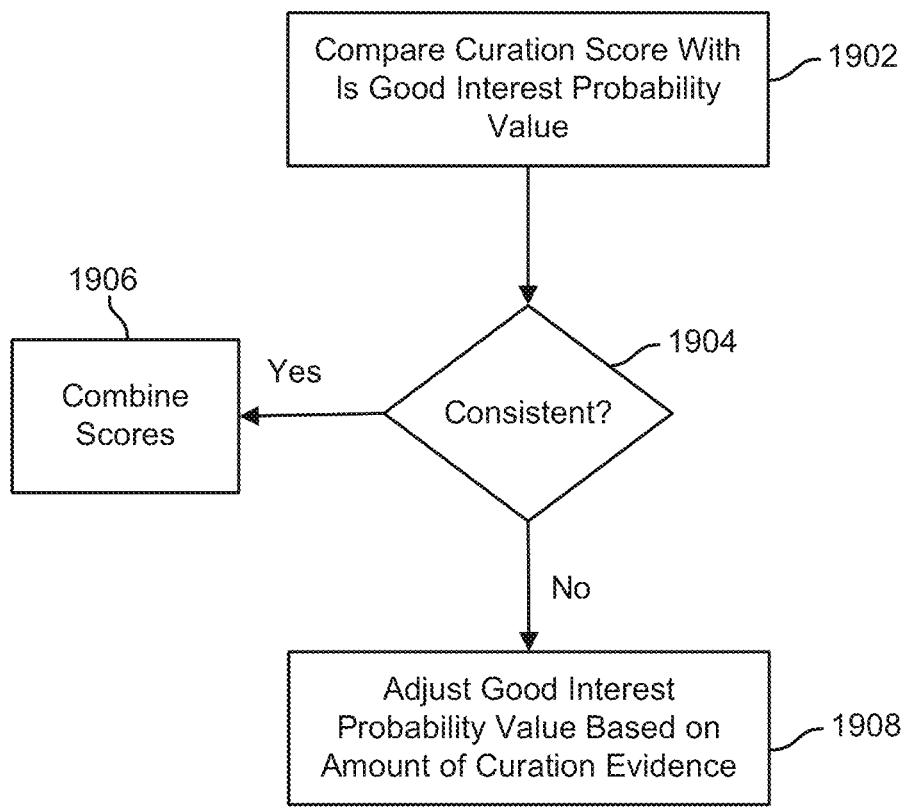
FIG. 19 is a flow diagram illustrating a process for adjusting a curation score and/or a good interest probability value in accordance with some embodiments.

FIG. 19 is a flow diagram illustrating a process for adjusting a curation score and/or a good interest probability value in accordance with some embodiments. Process 1900 may be implemented by a computing device, such as search and feed service 102. In some embodiments, process 1900 can be used to perform part of step 710.

At 1902, a curation score is compared with a good interest probability value. The curation score and good interest probability value may separately indicate that an interest is an objectively "bad interest," an objectively "good interest," or neither. A "bad interest" refers to an entity that may be malformed (e.g., "rocket"), too vague (e.g., "wood"), and/or of such nature that no user could possibly be interested (e.g., "2017"). A "good interest" is an interest with a threshold number of users that may be interested in viewing web documents associated with the interest.

In some embodiments, in the event all of the curator feedback indicates the entity is to be rejected, the entity is assigned a curation score of −1. In some embodiments, in the event all of the curator feedback indicates the entity is to be accepted, the entity is assigned a curation score of 1. In some embodiments, the curator feedback conflicts and the curation score is computed as $$\frac{(accepts - rejects - kN)}{(accepts + rejects + kN)}$$

where k is a constant and N is the number of times a curator indicated that the entity should never be an interest, such that the curation score is a value between −1 and 1.

In some embodiments, a "bad interest" has a curation score that is less than or equal to bad interest threshold value and greater than or equal to −1. In some embodiments, the bad interest threshold value is a negative number between −1 and 0. In some embodiments, a "good interest" has a curation score greater than or equal to a good interest threshold value and less than or equal to 1. In some embodiments, the good interest threshold value is a positive number between 0 and 1.

In some embodiments, an entity with a probability value less than or equal to a bad interest probability threshold is considered to be a "bad interest." In some embodiments, an entity with a probability value greater than or equal to a good interest probability threshold is considered to be a "good interest." In some embodiments, the bad interest probability threshold is less than the good interest probability threshold. In other embodiments, the bad interest probability threshold is equal to the good interest probability threshold.

At 1904, it is determined whether the curation score of an interest and the good interest probability value are consistent with each other. In the event the curation score of an interest is consistent with the good interest probability value of the interest, process 1900 proceeds to 1906. In the event the curation score of an interest is not consistent with the good interest probability value of the interest, process 1900 proceeds to 1908.

In some embodiments, the curation score and good interest probability value of an interest are consistent with each other because the curation score of the interest indicates the interest is a "good interest" and the good interest probability value of the interest also indicates the interest is a "good interest."

In some embodiments, the curation score and good interest probability value of an interest are consistent with each other because the curation score of the interest indicates the interest is a "bad interest" and the good interest probability value of the interest also indicates the interest is a "bad interest."

In some embodiments, the curation score and good interest probability value of an interest are inconsistent with each other because the curation score of the interest indicates the interest is a "good interest" and the good interest probability value of the interest also indicates the interest is a "bad interest."

In some embodiments, the curation score and good interest probability value of an interest are inconsistent with each other because the curation score of the interest indicates the interest is a "bad interest" and the good interest probability value of the interest also indicates the interest is a "good interest."

In some embodiments, the curation score and good interest probability value of an interest are inconsistent with each other because the curation score of the interest indicates the interest is a "good interest" and the good interest probability value of the interest also indicates the interest is not a "good interest" (i.e., "bad interest" or "okay interest").

In some embodiments, the curation score and good interest probability value of an interest are inconsistent with each other because the curation score of the interest indicates the interest is a "bad interest" and the good interest probability value of the interest also indicates the interest is not a "bad interest" (i.e., "good interest" or "okay interest").

In some embodiments, the curation score and good interest probability value of an interest are inconsistent with each other because the curation score of the interest indicates the interest is not a "good interest" (i.e., "bad interest" or "okay interest") and the good interest probability value of the interest also indicates the interest is a "good interest."

In some embodiments, the curation score and good interest probability value of an interest are inconsistent with each other because the curation score of the interest indicates the interest is not a "bad interest" (i.e., "good interest" or "okay interest") and the good interest probability value of the interest also indicates the interest is a "bad interest."

At 1906, the curation score and the good interest probability value are combined with each other. In some embodiments, the curation score and the good interest probability value are multiplied together. In some embodiments, the combined value is provided with the endorsement score and associated adjustment amounts to a machine learning model that is trained to output a confidence value that indicates whether an interest is relevant to the user.

At 1908, the good interest probability value is adjusted based on an amount of curation evidence associated with the curation score. Curation evidence may refer to a number of curators that contributed to the curation score (i.e., the number of "accepts" and "rejects"). In some embodiments, the good interest probability value is weighted based on the curation evidence. A good interest probability value may be weighted by a multiplier, an offset, or a combination of a multiplier and an offset. The degree to which the good interest probability value is weighted is based on the amount of curation evidence. For example, in the event a few curators contributed to the curation score (e.g., less than a threshold number of curators), the good interest probability value may be slightly weighted to a value slightly more consistent with the curation score. For example, if the curation score indicates a "good interest" and the good interest probability value indicates a "bad interest," the good interest probability value may be weighted from a value of 0.2 to 0.3. In the event a lot of curators contributed to the curation score (e.g., more than a threshold number of curators), the good interest probability value may be heavily weighted to a value that is more consistent with the curation score. For example, if the curation score indicates a "good interest" and the good interest probability value indicates a "bad interest," the good interest probability value may be weighted from a value of 0.2 to 0.6. In some embodiments, the curation score and good interest probability value are separately provided with the endorsement score and associated adjustment amounts to a machine learning model that is trained to output a confidence value that indicates whether an interest is relevant to the user. The machine learning model may implement logistic regression, logical regression, support vector machine, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        determine a curation score associated with an entity based at least in part on a plurality of tags applied to the entity by a plurality of different curator users, the entity corresponding to a potential user interest and the curation score indicating a first likelihood that a threshold number of a plurality of users will be interested in viewing web documents associated with the entity;

determine a good interest probability value associated with the entity based at least in part on one or more feature data values corresponding to the entity, the one or more feature data values being derived from a data source comprising information regarding the entity, wherein the good interest probability value indicates a second likelihood that the threshold number of the plurality of users will be interested in viewing the web documents associated with the entity; and generate a content feed for a user of the plurality of users, the content feed including one or more web documents selected based in part on the curation score associated with the entity and the good interest probability value associated with the entity, wherein the entity is distinct from the one or more web documents; and a memory coupled with the processor, wherein the memory is configured to provide the processor with instructions.

2. The system of claim 1, wherein the processor is further configured to:
aggregate the plurality of tags to determine the curation score.

3. The system of claim 1, wherein the data source comprises an information website.

4. The system of claim 3, wherein the one or more feature data values includes an inverse document frequency (IDF) value associated with the entity.

5. The system of claim 3, wherein the one or more feature data values includes a IDF value associated with one or more entities that resolve to the entity.

6. The system of claim 3, wherein the one or more feature data values includes a link probability value associated with the entity.

7. The system of claim 3, wherein the one or more feature data values includes a views over inlinks value associated with the entity.

8. The system of claim 3, wherein the one or more feature data values includes a ratio of inlinks of a web document associated with the entity to outlinks of the web document associated with the entity.

9. The system of claim 3, wherein the one or more feature data values includes a lowercase frequency value.

10. The system of claim 3, wherein the one or more feature data values includes a log value of users subscribed to a page associated with the entity.

11. The system of claim 3, wherein the good interest probability value is computed at least in part in applying the one or more feature data values corresponding to the entity to a machine learning model.

12. The system of claim 1, wherein the processor is further configured to:
determine whether the curation score associated with the entity is consistent with the good interest probability value associated with the entity;
adjust the good interest probability value to be more consistent with the curation score based at least in part on a number of the plurality of different curator users, when the curation score is determined to be inconsistent with the good interest probability value; and
generate the content feed based at least in part on the adjusted good interest probability value.

13. A method, comprising:
determining a curation score associated with an entity based at least in part on curator user feedback, the curation score indicating a first likelihood that a threshold number of users will be interested in viewing content associated with the entity;
determining a good interest probability value associated with the entity based at least in part on one or more statistical values associated with the entity, the one or more statistical values being independent of the curator user feedback, and the good interest probability value indicating a second likelihood that the threshold number of users will be interested in viewing content associated with the entity: and
generating a content feed for a user that includes one or more web documents based in part on the curation score associated with the entity and the good interest probability value associated with the entity, wherein the entity is distinct from the one or more web documents.

14. The method of claim 13, wherein the curation score is based on aggregated curator user feedback.

15. The method of claim 13, wherein the one or more statistical values associated with the entity comprises one or more feature data values associated with the entity.

16. The method of claim 15, wherein the good interest probability value is computed at least in part in applying the one or more feature data values associated with the entity to a machine learning model.

17. The method of claim 15, wherein the one or more feature data values includes a link probability value associated with the entity.

18. The method of claim 15, wherein the one or more feature data values includes a views over inlinks value associated with the entity.

19. The method of claim 13, further comprising:
determining whether the curation score associated with the entity is consistent with the good interest probability value associated with the entity;
adjusting the good interest probability value based at least in part on a number of curator users that provided the curator user feedback when the curation score is inconsistent with the good interest probability value; and
generating the content feed based at least in part on the adjusted good interest probability value.

20. A computer program product, the computer program product being embodied in a tangible non-transitory computer readable storage medium and comprising computer instructions for:
determining a curation score associated with an entity based at least in part on aggregated curator user feedback the curation score indicating a first likelihood that a threshold number of users will be interested in viewing content associated with the entity;
determining a good interest probability value associated with the entity based at least in part on applying computed values associated with the entity to a machine learning model, the good interest probability value indicating a second likelihood that the threshold number of users will be interested in viewing the content associated with the entity: and
generating a content feed for a user that includes one or more web documents based in part on an evaluated consistency between the curation score associated with the entity and the good interest probability value associated with the entity, wherein the entity is distinct from the one or more web documents.

* * * * *